US012103617B2

(12) United States Patent
Akatsuka et al.

(10) Patent No.: US 12,103,617 B2
(45) Date of Patent: Oct. 1, 2024

(54) VEHICLE CONTROL SYSTEM AND VEHICLE CONTROL METHOD FOR A VEHICLE OF A STEER-BY-WIRE TYPE

(71) Applicants: TOYOTA JIDOSHA KABUSHIKI KAISHA, Toyota (JP); JTEKT CORPORATION, Kariya (JP)

(72) Inventors: Kosuke Akatsuka, Mishima (JP); Yoshio Kudo, Machida (JP); Isao Namikawa, Okazaki (JP); Takashi Kodera, Okazaki (JP); Koji Anraku, Okazaki (JP); Junya Miyake, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 240 days.

(21) Appl. No.: 17/709,558

(22) Filed: Mar. 31, 2022

(65) Prior Publication Data
US 2022/0332367 A1 Oct. 20, 2022

(30) Foreign Application Priority Data

Apr. 16, 2021 (JP) .................................. 2021-069757

(51) Int. Cl.
*B62D 6/00* (2006.01)
*B60Q 9/00* (2006.01)

(52) U.S. Cl.
CPC ............... *B62D 6/008* (2013.01); *B60Q 9/00* (2013.01)

(58) Field of Classification Search
CPC .................................. B62D 6/008; B60Q 9/00
See application file for complete search history.

(56) References Cited

U.S. PATENT DOCUMENTS

| 2019/0233003 A1 | 8/2019 | Kodera |
| 2020/0283062 A1 | 9/2020 | Kudo |

FOREIGN PATENT DOCUMENTS

| JP | 2003-2223 A | 1/2003 |
| JP | 2019-131014 A | 8/2019 |
| JP | 2020-142704 A | 9/2020 |

*Primary Examiner* — Michael D Lang
(74) *Attorney, Agent, or Firm* — Sughrue Mion, PLLC

(57) ABSTRACT

A vehicle control system controls a steer-by-wire type vehicle. The vehicle control system executes: reaction force control that applies a steering reaction force to a steering wheel; and driving assist control that assists driving of the vehicle. The reaction force control includes road information transmission control that applies a steering reaction force component corresponding to an oscillation caused by road surface unevenness to the steering wheel. The vehicle control system deactivates the road information transmission control when a deactivation condition is satisfied. The deactivation condition is that the driving assist control is in operation and a steering parameter reflecting a driver's steering intention is less than a threshold. As another example, the deactivation condition is that the driving assist control that vibrates the steering wheel for notifying the driver of a possibility of a lane departure is in operation.

4 Claims, 20 Drawing Sheets

VEHICLE CONTROL SYSTEM AND VEHICLE CONTROL METHOD FOR A VEHICLE OF A STEER-BY-WIRE TYPE

CROSS-REFERENCE TO RELATED APPLICATION

The present disclosure claims priority to Japanese Patent Application No. 2021-069757, filed on Apr. 16, 2021, the contents of which application are incorporated herein by reference in there entirety.

BACKGROUND

Technical Field

The present disclosure relates to a technique of controlling a vehicle of a steer-by-wire (SBW) type.

Background Art

Patent Literature 1 discloses a vehicle employing a steer-by-wire system. In the case of the steer-by-wire system, a turning device for turning a wheel is mechanically separated from a steering wheel. Instead, reaction force control that applies a pseudo steering reaction force to the steering wheel is performed in order to give a steering feeling to a driver.

Patent Literature 2 discloses "road information transmission control" as a type of the reaction force control. The road information transmission control is the reaction force control intended to notify a driver of road surface unevenness (road information). The road information transmission control detects a high-frequency oscillation caused by the road surface unevenness and applies a steering reaction force component corresponding to the high-frequency oscillation to a steering wheel.

LIST OF RELATED ART

Patent Literature 1: Japanese Laid-Open Patent Application Publication No. JP-2003-002223
Patent Literature 2: Japanese Laid-Open Patent Application Publication No. JP-2020-142704

SUMMARY

A case where a vehicle of a steer-by-wire type has a function of driving assist control is considered. For example, the driving assist control automatically performs steering independently of a steering operation by a driver. Meanwhile, various examples are conceivable as a purpose (type) of reaction force control that applies a steering reaction force to a steering wheel. When the driving assist control and the reaction force control are simultaneously in operation, the driver may feel annoyed or operability of the steering wheel may be deteriorated, depending on the purpose (type) of the reaction force control.

As an example, the road information transmission control disclosed in Patent Literature 2 described above is considered. When the driving assist control is in operation, the driver does not necessarily have a steering intention. If the road information transmission control is performed although the driver does not have the steering intention, the driver feels annoyed for the high-frequency oscillation of the steering wheel.

As described above, there is room for improvement as to the reaction force control in the case where the vehicle of the steer-by-wire type has the function of the driving assist control.

A first aspect is directed to a vehicle control system and a vehicle control method that control a vehicle of a steer-by-wire type.

The vehicle control system includes one or more processors.

The one or more processors are configured to execute:
reaction force control that applies a steering reaction force to a steering wheel of the vehicle; and
driving assist control that assists driving of the vehicle.

The reaction force control includes road information transmission control that applies a steering reaction force component corresponding to an oscillation caused by road surface unevenness to the steering wheel.

The one or more processors are further configured to set the steering reaction force component caused by the road information transmission control to zero when a deactivation condition is satisfied.

For example, the deactivation condition is that the driving assist control is in operation and a steering parameter reflecting a steering intention of a driver of the vehicle is less than a threshold.

As another example, the deactivation condition is that the driving assist control that vibrates the steering wheel for notifying the driver of a possibility of a lane departure is in operation.

A second aspect is directed to a vehicle control system and a vehicle control method that control a vehicle of a steer-by-wire type.

The vehicle control system includes one or more processors.

The one or more processors are configured to execute:
turning control that turns a wheel of the vehicle according to a target turn angle;
reaction force control that applies a steering reaction force to a steering wheel of the vehicle; and
driving assist control that assists driving of the vehicle.

The turning control includes:
calculating a first target turn angle according to a steering operation of the steering wheel by a driver of the vehicle; and
turn angle distribution control that determines the target turn angle by combining the first target turn angle and a second target turn angle required by the driving assist control, when a turn angle distribution condition is satisfied during operation of the driving assist control.

The reaction force control includes deviation compensation control that detects a deviation between the first target turn angle and an actual turn angle and applies a steering reaction force component to the steering wheel in a direction of reducing the deviation.

The one or more processors are further configured to set the steering reaction force component caused by the deviation compensation control to zero in at least a part of a period in which the turn angle distribution condition is satisfied.

According to the first aspect, when the deactivation condition is satisfied, the steering reaction force component caused by the road information transmission control is set to zero.

A first example of the deactivation condition is that the driving assist control is in operation and the steering parameter reflecting the steering intention of the driver is less than the threshold. This deactivation condition makes it possible to suppress the driver from feeling annoyed when there is no or weak steering intention of the driver.

A second example of the deactivation condition is that the driving assist control (lane departure suppression control) that vibrates the steering wheel for notifying the driver of a possibility of the lane departure is in operation. This deactivation condition makes it possible to suppress interference or resonance between the steering wheel vibration due to the road information transmission control and the steering wheel vibration due to the lane departure suppression control. It is thus possible to suppress reduction in warning effect obtained by the lane departure suppression control.

According to the second aspect, the steering reaction force component caused by the deviation compensation control is set to zero in at least a part of the period in which the turn angle distribution condition is satisfied. This makes it possible to suppress the deviation compensation control from unnecessarily interfering the steering operation. It is thus possible to suppress reduction in operability of the steering wheel.

EMBODIMENTS

Embodiments of the present disclosure will be described below with reference to the attached drawings.

1. Vehicle Control System 1-1. Configuration Example

Figure 1:
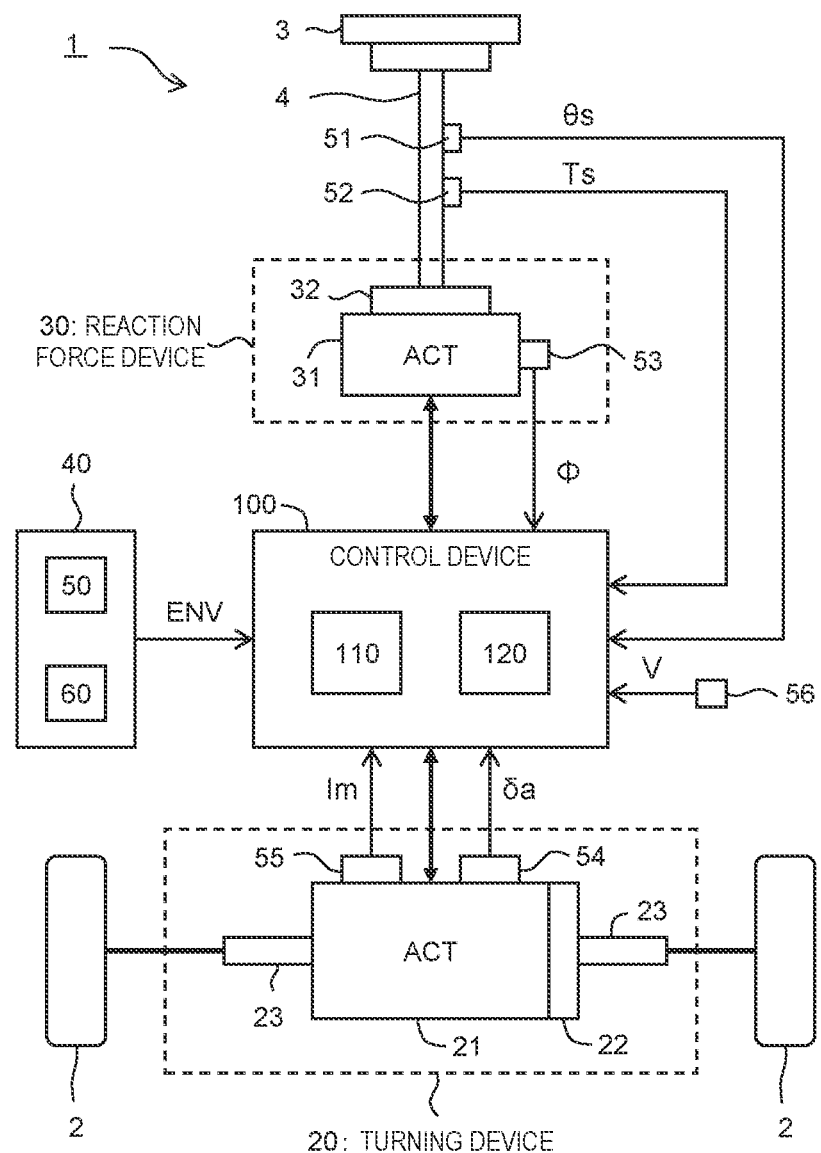
FIG. 1 is a schematic diagram showing a configuration example of a vehicle and a vehicle control system according to an embodiment.

FIG. 1 is a schematic diagram showing a configuration example of a vehicle 1 and a vehicle control system 10 according to the present embodiment. The vehicle 1 is provided with a wheel 2 and a steering wheel 3. The steering wheel 3 is an operation member that a driver of the vehicle 1 uses for a steering operation. A steering shaft 4 is coupled with the steering wheel 3 and rotates together with the steering wheel 3. The vehicle 1 is a vehicle of a steer-by-wire type, and the wheel 2 and the steering wheel 3 are mechanically disconnected from each other.

The vehicle control system 10 controls the vehicle 1 of the steer-by-wire type. The vehicle control system 10 includes a turning device 20, a reaction force device 30, a driving environment information acquisition device 40, and a control device 100.

The turning device 20 turns the wheel 2. Here, turning the wheel 2 means changing a direction of the wheel 2 for making a turn. The turning device 20 includes a turning actuator 21 for turning the wheel 2. For example, the turning actuator 21 is a turning motor. A rotor or the turning motor is connected to a turning bar 23 through a speed reducer 22. The turning bar 23 is coupled with the wheel 2. When the turning motor rotates, its rotational motion is converted into a linear motion of the turning bar 23, and thereby the wheel 2 turns (i.e. changes its direction). That is, actuating the turning motor makes it possible to turn the wheel 2. The operation of the turning actuator 21 is controlled by the control device 100.

The reaction force device 30 applies a steering reaction force (reaction torque) to the steering wheel 3. The reaction force device 30 includes a reaction force actuator 31 for applying the steering reaction force to the steering wheel 3. For example, the reaction force actuator 31 is a reaction force motor. Actuating the reaction force motor makes it possible to apply the steering reaction force to the steering shaft 4 and thus to the steering wheel 3. The operation of the reaction force actuator 31 is controlled by the control device 100.

The driving environment information acquisition device 40 acquires driving environment information ENV indicating a driving environment for the vehicle 1. The driving environment information acquisition device 40 includes a vehicle state sensor 50, a recognition sensor 60, and the like.

The vehicle state sensor 50 detects a state of the vehicle 1. The vehicle state sensor 50 includes a steering angle sensor 51, a steering torque sensor 52, a rotational angle sensor 53, a rotational angle sensor 54, a turning current sensor 55, a vehicle speed sensor 56, and the like. The steering angle sensor 51 detects a steering angle θs (i.e., a steering wheel angle) of the steering wheel 3. The steering torque sensor 52 detects a steering torque Ts applied to the steering shaft 4. The rotational angle sensor 53 detects a rotation angle Φ of the reaction force actuator 31 (e.g., the reaction force motor). The rotational angle sensor 54 detects a rotation angle of the turning actuator 21 (e.g., the turning motor). The rotation angle of the turning motor corresponds to a turn angle (i.e., an actual turn angle δa) of the wheel 2. It can be also said that the rotational angle sensor 54 detects the actual turn angle δa of the wheel 2. The turning current sensor 55 detects a turning current Im that drives the turning actuator 21. The vehicle speed sensor 56 detects a vehicle speed V being a speed of the vehicle 1. In addition, the vehicle state sensor 50 may include a yaw rate sensor and an acceleration sensor.

The recognition sensor 60 recognizes (detects) a situation around the vehicle 1. Examples of the recognition sensor 60 include a camera, a LIDAR (Laser Imaging Detection and Ranging), a radar, and the like.

The driving environment information acquisition device 40 may further include a position sensor that acquires a position of the vehicle 1. The position sensor is exemplified by a GPS (Global Positioning System) sensor. The driving environment information acquisition device 40 may acquire map information.

The driving environment information ENV includes vehicle state information and surrounding situation information. The vehicle state information indicates the vehicle state detected by the vehicle state sensor 50. The surrounding situation information indicates results of recognition by the recognition sensor 60. For example, the surrounding situation information includes an image captured by the camera. The surrounding situation information may include object information about objects around the vehicle 1. Examples of the objects around the vehicle 1 include a pedestrian, another vehicle (e.g., a preceding vehicle, a parked vehicle, etc.), a sign, a white line, a roadside structure, and the like. The object information indicates a relative position and a relative velocity of the object with respect to the vehicle 1. The driving environment information ENV may further include the position information of the vehicle 1, the map information, and the like.

The control device (controller) 100 controls the vehicle 1. The control device 100 includes one or more processors 110 (hereinafter simply referred to as a processor 110) and one or more memory devices 120 (hereinafter simply referred to as a memory devices 120). The processor 110 executes a variety of processing. For example, the processor 110 includes a CPU (Central Processing Unit). The memory device (memory) 120 stores a variety of information necessary for the processing by the processor 110. Examples of the memory device 120 include a volatile memory, a non-volatile memory, an HDD (Hard Disk Drive), an SSD (Solid State Drive), and the like. The control device 100 may include one or more ECUs (Electronic Control Units).

The variety of processing by the control device 100 is implemented by the processor 110 executing a control program being a computer program. The control program is stored in the memory device 120. As another example, the control program may be recorded on a non-transitory computer-readable recording medium.

The control device 100 (i.e., the processor 110) acquires the driving environment information ENV from the driving environment information acquisition device 40. The driving environment information ENV is stored in the memory device 120.

Figure 2:
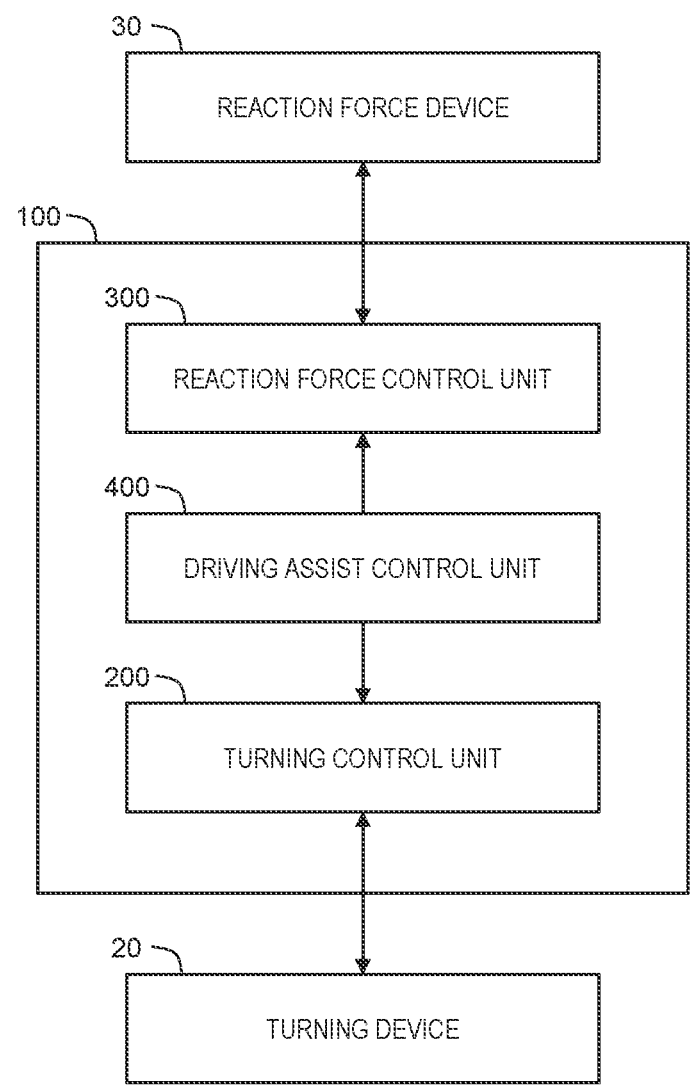
FIG. 2 is a block diagram showing a functional configuration of a control device of a vehicle control system according to an embodiment.

FIG. 2 is a block diagram showing a functional configuration of the control device 100. The control device 100 includes a turning control unit 200, a reaction force control unit 300, and a driving assist control unit 400 as functional blocks. These functional blocks are realized by a cooperation of the processor 110 executing the control program and the memory device 120. It should be noted that the turning control unit 200, the reaction force control unit 300, and the driving assist control unit 400 may be realized by different control devices, respectively. In that case, the control devices are communicably connected to each other and communicate necessary information with each other.

Hereinafter, each of the turning control unit 200, the reaction force control unit 300, and the driving assist control unit 400 will be described in more detail.

1-2. Turning Control

The turning control unit 200 executes "turning control" that turns the wheel 2. More specifically, the turning control unit 200 turns (i.e., changes a direction of) the wheel 2 by controlling the turning actuator 21 of the turning device 20.

The turning control unit 200 executes the turning control in response to a steering operation of the steering wheel 3 performed by the driver. For example, the turning control unit 200 calculates a target turn angle δt based on the steering angle θs and the vehicle speed V. The steering angle θs is detected by the steering angle sensor 51. As another example, the steering angle θs may be calculated from the rotation angle Φ detected by the rotational angle sensor 53. The vehicle speed V is detected by the vehicle speed sensor 56. The turning control unit 200 turns the wheel 2 according to the target turn angle δt. The actual turn angle δa of the wheel 2 is detected by the rotational angle sensor 54. The turning control unit 200 controls the turning actuator 21 such that the actual turn angle δa follows the target turn angle δt. More specifically, the turning control unit 200 generates a control signal for driving the turning actuator 21 based on a deviation between the target turn angle δt and the actual turn angle δa of the wheel 2. The turning actuator 21 is driven according to the control signal, and thereby the wheel 2 is turned. It should be noted a current driving the turning actuator 21 at this time is the turning current Im.

Moreover, the turning control unit 200 executes the turning control according to a request from the driving assist control unit 400 described later. In this case, the turning control unit 200 acquires a target control amount from the driving assist control unit 400 and executes the turning control according to the target control amount.

1-3. Reaction Force Control

The reaction force control unit 300 executes "reaction force control" that applies the steering reaction force (reaction torque) to the steering wheel 3. More specifically, the reaction force control unit 300 applies the steering reaction force to the steering wheel 3 by controlling the reaction force actuator 31 of the reaction force device 30.

The reaction force control unit 300 executes the reaction force control in response to the steering operation of the steering wheel 3 performed by the driver. For example, the reaction force control unit 300 calculates a target steering reaction force (spring component) corresponding to a self-aligning torque applied to the wheel 2, based on the steering angle θs and the vehicle speed V. The target steering reaction force may further include a damping component according to a steering speed (dθs/dt). The reaction force control unit 300 controls the reaction force actuator 31 so as to generate the target steering reaction force. More specifically, the reaction force control unit 300 generates a control signal for driving the reaction force actuator 31 based on the target steering reaction force. The reaction force actuator 31 is driven according to the control signal, and thereby the steering reaction force is generated.

Moreover, the reaction force control unit 300 may execute the reaction force control according to a request from the driving assist control unit 400 described later.

1-4. Driving Assist Control

The driving assist control unit 400 executes "driving assist control" that assists driving of the vehicle 1. The driving assist control automatically controls travel of the vehicle 1 independently of a driving operation by the driver. In the present embodiment, the driving assist control related to steering will be considered in particular. Examples of such the driving assist control include automated driving control, risk avoidance control, lane keep assist control (LTA: Lane Tracing Assist), lane departure suppression control (LDA: Lane Departure Alert), and the like.

The automated driving control controls automated driving of the vehicle 1. More specifically, the driving assist control unit 400 generates a travel plan of the vehicle 1 based on the driving environment information ENV. Examples of the travel plan include keeping a current travel lane, making a lane change, making a right or left turn, avoiding an obstacle, and the like. Furthermore, the driving assist control unit 400 generates a target trajectory TRJ necessary for the vehicle 1 to travel in accordance with the travel plan, based on the driving environment information ENV. The target trajectory TRJ includes a target position and a target speed. Then, the driving assist control unit 400 performs vehicle travel control such that the vehicle 1 follows the target trajectory TRJ.

More specifically, the driving assist control unit 400 calculates a deviation (e.g., a lateral deviation, a yaw angle deviation, and a speed deviation) between the vehicle 1 and the target trajectory TRJ, and calculates a target control amount necessary for reducing the deviation. Examples of the target control amount include a target turn angle, a target yaw rate, a target speed, a target acceleration, a target deceleration, a target current, and the like. The driving assist control unit 400 performs the vehicle travel control according to the target control amount. The vehicle travel control includes turning control, acceleration control, and deceleration control. The turning control is performed through the turning control unit 200 described above. The acceleration control and the deceleration control are performed by controlling a driving device and a braking device (not shown) of the vehicle 1.

Figure 3:
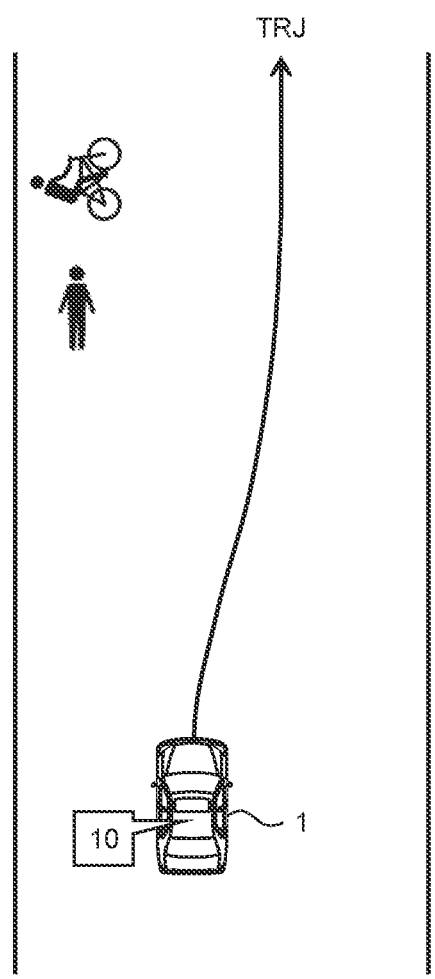
FIG. 3 is a conceptual diagram for explaining risk avoidance control being an example of driving assist control.

FIG. 3 is a conceptual diagram for explaining the risk avoidance control. The risk avoidance control is the driving assist control for reducing a risk of collision with an object existing ahead of the vehicle 1. Examples of the object as the avoidance target include a pedestrian, a bicycle, a motorcycle, an animal, another vehicle, and the like. The driving assist control unit 400 recognizes the object existing ahead of the vehicle 1 based on the surrounding situation information (object information) included in the driving environment information ENV. For example, when the risk of collision with the recognized object exceeds a threshold, the driving assist control unit 400 executes the risk avoidance control. More specifically, the driving assist control unit 400 generates a target trajectory TRJ moving in a direction away from the object in order to secure a lateral distance to the object. Then, the driving assist control unit 400 performs the vehicle travel control such that the vehicle 1 follows the target trajectory TRJ. The vehicle travel control here includes at least one of the turning control and the deceleration control. The turning control is performed through the turning control unit 200 described above.

Figure 4:
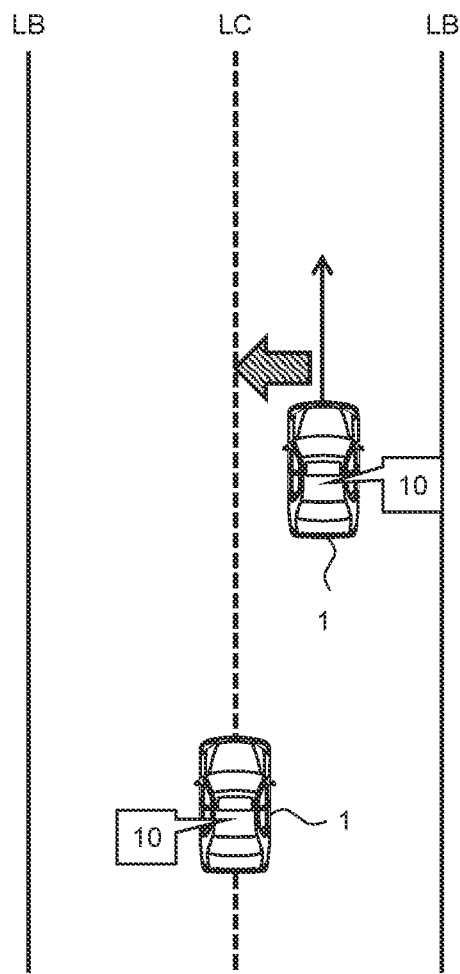
FIG. 4 is a conceptual diagram for explaining lane keep assist control being another example of driving assist control.

FIG. 4 is a conceptual diagram for explaining the lane keep assist control. The lane keep assist control is the driving assist control for assisting the vehicle 1 to travel along a lane center LC. The lane is an area sandwiched between left and right lane boundaries LB. Examples of the lane boundary LB include a white line (lane marking), a curb, and the like. The lane center LC is a center line of the lane. The driving assist control unit 400 recognizes the lane boundary LB and the lane center LC based on the surrounding situation information included in the driving environment information ENV. When the vehicle 1 deviates from the lane center LC, the driving assist control unit 400 executes the lane keep assist control. More specifically, the driving assist control unit 400 executes the turning control such that the vehicle 1 returns back to the lane center LC. The turning control is performed through the turning control unit 200 described above.

Figure 5:
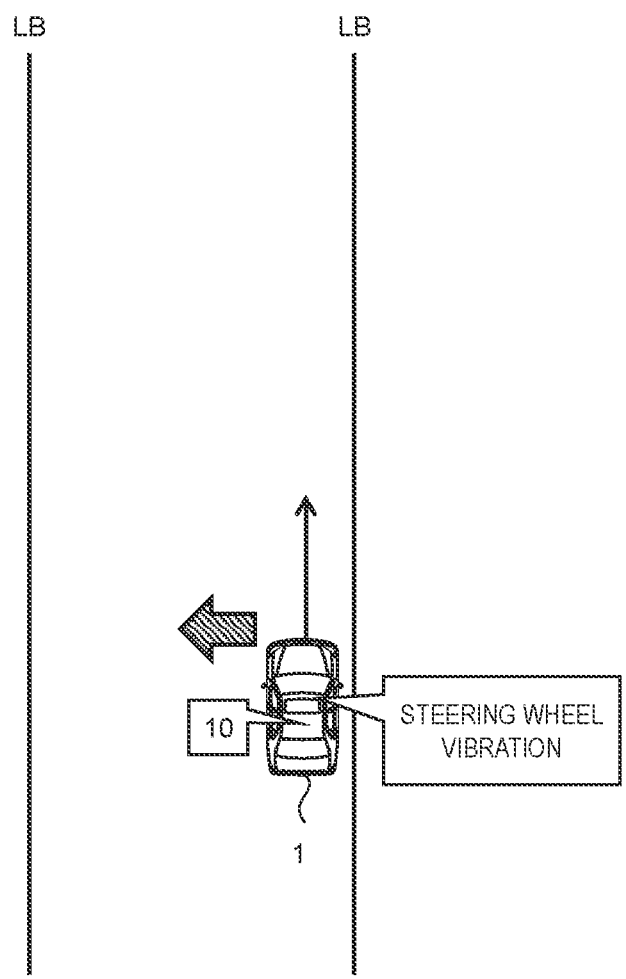
FIG. 5 is a conceptual diagram for explaining lane departure suppression control being yet another example of driving assist control.

FIG. 5 is a conceptual diagram for explaining the lane departure suppression control. The lane departure suppression control is the driving assist control for suppressing the vehicle 1 from departing from a travel lane. The driving assist control unit 400 recognizes the lane boundary LB based on the surrounding situation information included in the driving environment information ENV. When a distance between the vehicle 1 and the lane boundary LB becomes less than a predetermined threshold, the driving assist control unit 400 executes the lane departure suppression control. More specifically, the driving assist control unit 400 notifies the driver of a possibility of the lane departure. For example, the driving assist control unit 400 vibrates the steering wheel 3 by controlling a steering wheel vibration mechanism (not shown). The driving assist control unit 400 may output an alert through display and/or audio. Moreover, the driving assist control unit 400 may execute the turning control such that the vehicle 1 moves toward the lane center LC. The turning control is performed through the turning control unit 200 described above.

2. Cooperation of Reaction Force Control and Driving Assist Control

Various examples are conceivable as a purpose (type) of the reaction force control that applies the steering reaction force to the steering wheel 3. When the driving assist control and the reaction force control are simultaneously in operation, the driver may feel annoyed or operability of the steering wheel 3 may be deteriorated, depending on the purpose (type) of the reaction force control. In that sense, there is room for improvement as to the reaction force control in the case where the vehicle 1 of the steer-by-wire type has the function of the driving assist control.

In the present embodiment, two types of control, "road information transmission control" and "deviation compensation control" will be considered as examples of the reaction force control having a special purpose. The reaction force control according to the present embodiment includes at least one of the "road information transmission control" and the "deviation compensation control", in addition to a common reaction force control that simulates the self-aligning torque. Hereinafter, each case of the "road information transmission control" and the "deviation compensation control" will be described in detail.

3. Road Information Transmission Control

3-1. Basic Explanation

The road information transmission control is the reaction force control intended to notify the driver of road surface unevenness (road information). The road information transmission control detects a high-frequency oscillation caused by the road surface unevenness and applies a steering reaction force component corresponding to the high-frequency oscillation to the steering wheel 3 (see Patent Literature 2).

Figure 6:
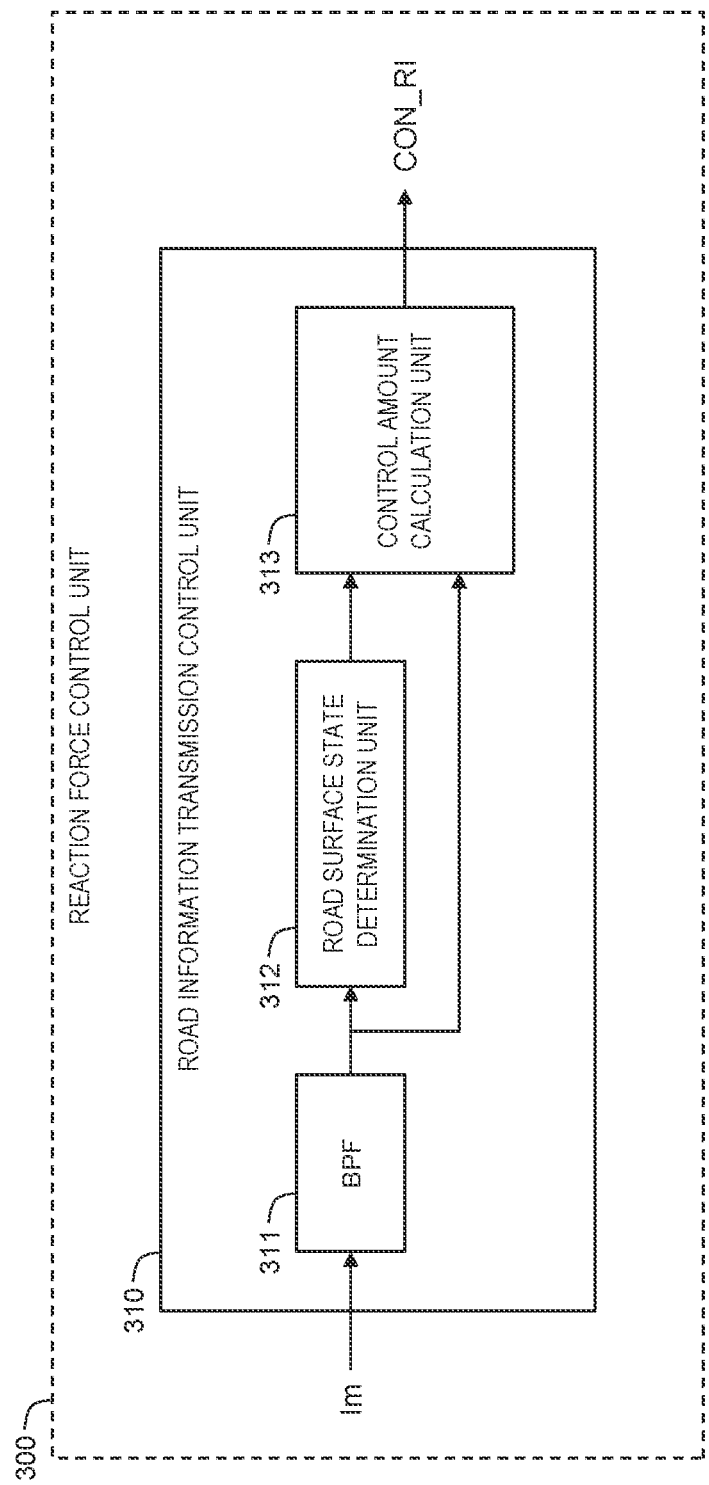
FIG. 6 is a diagram for explaining road information transmission control according to an embodiment.

FIG. 6 is a diagram for explaining the road information transmission control according to the present embodiment. The reaction force control unit 300 includes a road information transmission control unit 310. The road information transmission control unit 310 detects the high-frequency oscillation caused by the road surface unevenness, based on the turning current Im. The turning current Im is detected by the turning current sensor 55. Then, the road information transmission control unit 310 calculates a target control amount CON_RI for generating the steering reaction force component corresponding to the high-frequency oscillation.

More specifically, the road information transmission control unit 310 includes a bandpass filter 311, a road surface state determination unit 312, and a control amount calculation unit 313. The bandpass filter 311 extracts signals of a predetermined frequency range from a signal of the turning current Im. The predetermined frequency range is set to correspond to a frequency range of the high-frequency oscillation caused by the road surface unevenness.

The road surface state determination unit 312 determines whether a road surface is a flat road or a rough road based on filtered turning current Im. For example, the road surface state determination unit 312 compares the turning current Im with a predetermined current threshold to count the number of times that the turning current Im exceeds the predetermined current threshold within a certain period of time. When the number of times is equal to or larger than a threshold, the road surface state determination unit 312 determines that the road surface is the rough road, that is, there is the road surface unevenness. As another example, when the turning current Im exceeds a dead band, the road surface state determination unit 312 may determine that there is the road surface unevenness.

The control amount calculation unit 313 calculates the target control amount CON_RI for generating the steering reaction force component corresponding to the high-frequency oscillation caused by the road surface unevenness. For example, the control amount calculation unit 313 calculates the target control amount CON_RI by multiplying the filtered turning current Im by a predetermined gain.

The reaction force control unit 300 calculates a final target control amount by combining the target control amount CON_RI caused by the road information transmission control and another target control amount caused by another type of reaction force control. Then, the reaction force control unit 300 executes the reaction force control by controlling the reaction force actuator 31 of the reaction force device 30 in accordance with the final target control amount.

3-2. Deactivation of Road Information Transmission Control

In a situation where the driving assist control and the road information transmission control are simultaneously in operation, the following problem is caused. When the driving assist control is in operation, the driver does not necessarily have a steering intention. If the road information transmission control is performed although the driver does not have the steering intention, the driver feels annoyed for the high-frequency oscillation of the steering wheel 3.

In view of the above, according to the present embodiment, when the driving assist control is in operation and there is no or weak steering intention of the driver, the reaction force control unit 300 deactivates the road information transmission control. "Deactivating the road information transmission control" means setting the steering reaction force component caused by the road information transmission control to zero.

More specifically, the reaction force control unit 300 acquires a steering parameter that reflects the steering intention of the driver. For example, the steering torque Ts is used as the steering parameter reflecting the steering intention of the driver. The steering torque Ts is detected by the steering torque sensor 52. Then, the reaction force control unit 300 sets a threshold Tth_RI, and compares the steering parameter with the threshold Tth_RI. A deactivation condition for deactivating the road information transmission control is that "the driving assist control is in operation and the steering parameter is less than the threshold Tth_RI." When the deactivation condition is satisfied, the reaction force control unit 300 deactivates the road information transmission control, that is, sets the steering reaction force component caused by the road information transmission control to zero. This makes it possible to suppress the driver from feeling annoyed when there is no or weak steering intention of the driver.

As a basis for setting the threshold Tth_RI regarding the road information transmission control, a "steering determination threshold Tth_S" used for driver's steering determination is considered. When the driving assist control is in operation, determining whether or not the driver is steering is necessary for detecting an override and the like by the driver. The steering determination threshold Tth_S is used for the driver's steering determination. When the steering parameter is less than the steering determination threshold Tth_S, the control device 100 determines that the driver is not steering the steering wheel 3 and sets a driver's steering flag to OFF. On the other hand, when the steering parameter is equal to or greater than the steering determination threshold Tth_S, the control device 100 determines that the driver is steering the steering wheel 3 and sets the driver's steering flag to ON. It should be noted that the steering determination threshold Tth_S may be set to different values depending on the type of the driving assist control being in operation. For example, in a case of the automated driving control, the steering determination threshold Tth_S is set relatively high in order to suppress an erroneous determination. As another example, in a case of the lane keep assist control, the steering determination threshold Tth_S is set relatively low.

Figure 7:
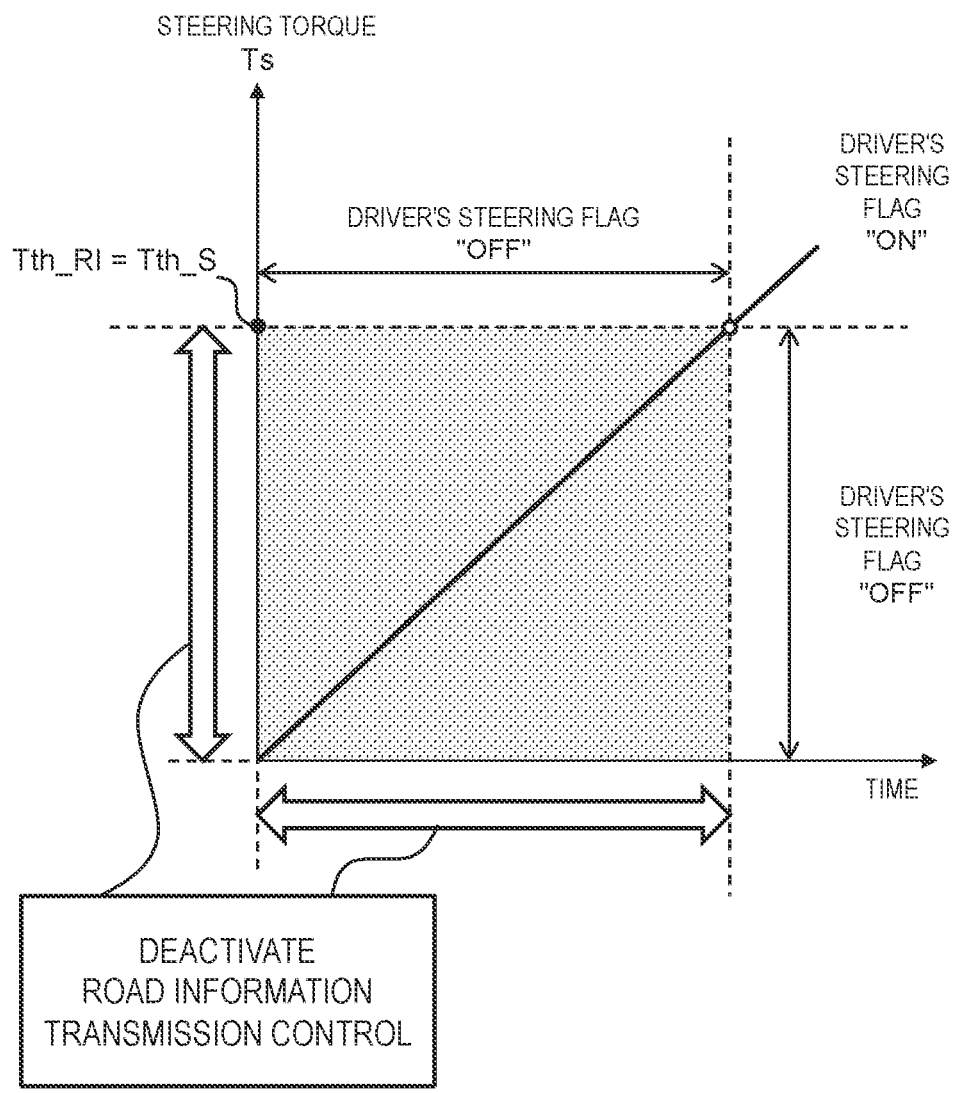
FIG. 7 is a diagram for explaining an example of deactivation of road information transmission control according to an embodiment.

FIG. 7 is a diagram for explaining an example of the deactivation of the road information transmission control. A horizontal axis represents time, and a vertical axis represents the steering parameter (e.g., the steering torque Ts). In the example shown in FIG. 7, the threshold Tth_RI regarding the road information transmission control is set to be equal to the steering determination threshold Tth_S (i.e., Tth_RI=Tth_S). In this case, it can be said that the deactivation condition for deactivating the road information transmission control is that "the driving assist control is in operation and the driver's steering flag is OFF."

Figure 8:
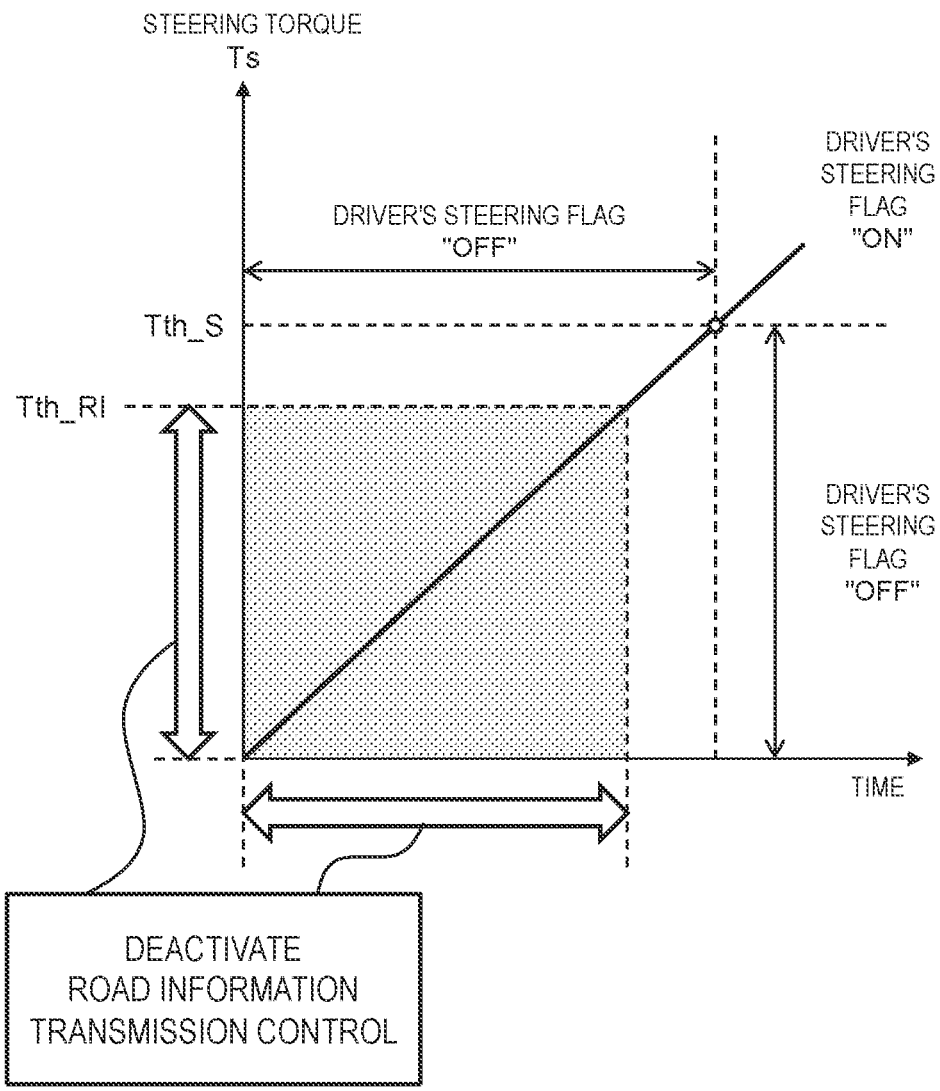
FIG. 8 is a diagram for explaining another example of deactivation of road information transmission control according to an embodiment.

FIG. 8 is a diagram for explaining another example of the deactivation of the road information transmission control. In the example shown in FIG. 8, the threshold Tth_RI regarding the road information transmission control is set to be higher than 0 and less than the steering determination threshold Tth_S. Even in this case, at least the effect of reducing the driver's feeling of annoyance can be obtained.

When the threshold Tth_RI is less than the steering determination threshold Tth_S, the reaction force control unit 300 may gradually increase an output gain of the road information transmission control as the steering torque Ts increases from the threshold Tth_RI and becomes closer to the steering determination threshold Tth_S.

Figure 9:
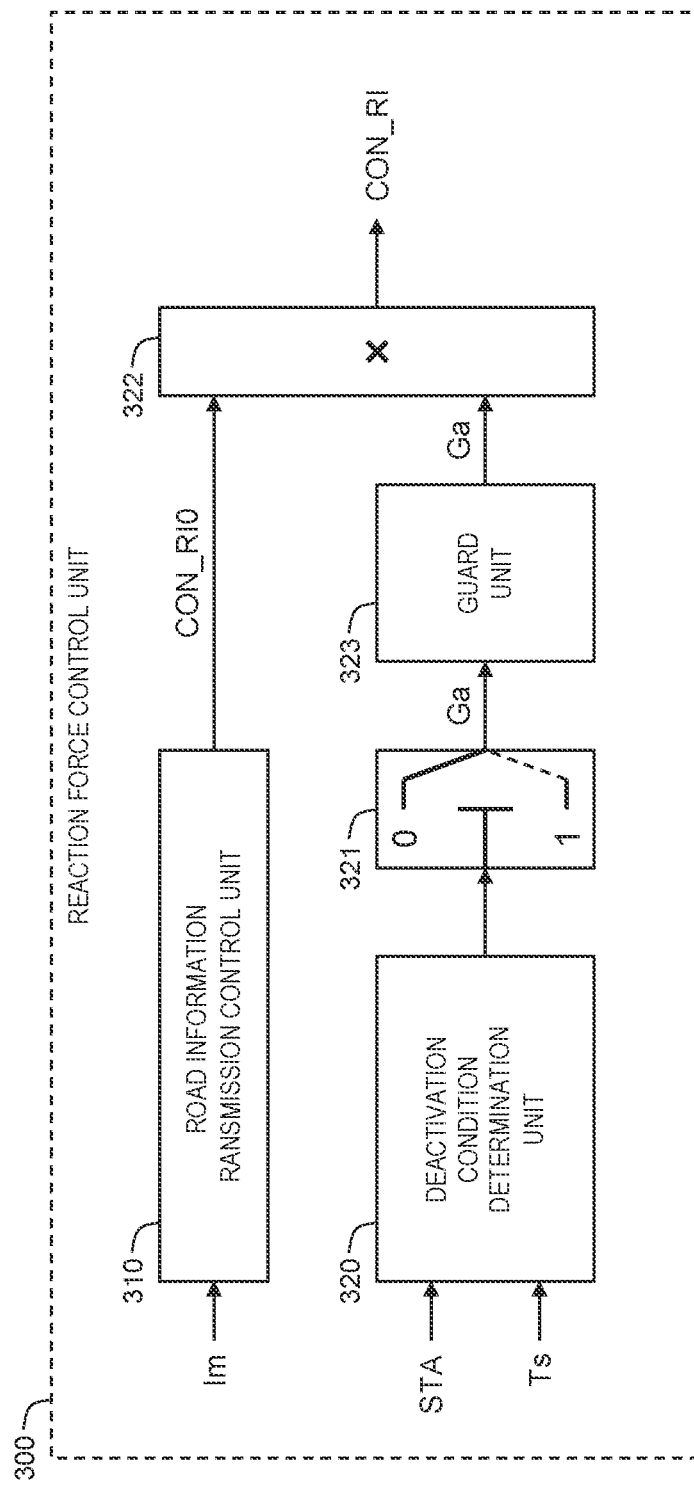
FIG. 9 is a block diagram showing a functional configuration example related to road information transmission control according to an embodiment.

3-3. Functional Configuration Example Related to Road Information Transmission Control FIG. 9 is a block diagram showing a functional configuration example related to the road information transmission control according to the present embodiment. The reaction force control unit 300 includes the road information transmission control unit 310, a deactivation condition determination unit 320, a gain switching unit 321, and a multiplier unit 322. The reaction force control unit 300 may further include a guard unit 323.

As described above, the road information transmission control unit 310 calculates the target control amount CON_RI based on the turning current Im (see FIG. 6). For convenience sake, the target control amount CON_RI calculated by the road information transmission control unit 310 is hereinafter referred to as a "target control amount CON_RI0."

The deactivation condition determination unit 320 determines whether or not the deactivation condition is satisfied based on driving assist control state information STA and the steering parameter (e.g., the steering torque Ts). The driving assist control state information STA includes information indicating whether or not the driving assist control is in operation. The driving assist control state information STA is given from the driving assist control unit 400. As described above, the deactivation condition is that "the driving assist control is in operation and the steering parameter is less than the threshold Tth_RI."

The gain switching unit 321 switches a control amount gain Ga according to a result of determination by the deactivation condition determination unit 320. More specifically, when the deactivation condition is satisfied, the gain switching unit 321 sets the control amount gain Ga to "0." On the other hand, when the deactivation condition is not satisfied, the gain switching unit 321 sets the control amount gain Ga to "1."

The multiplier unit 322 multiplies the target control amount CON_RI0 calculated by the road information transmission control unit 310 by the control amount gain Ga to calculate a final target control amount CON_RI regarding the road information transmission control (i.e., CON_RI=Ga×CON_RI0).

When the deactivation condition is satisfied, the control amount gain Ga is set to "0." As a result, the target control amount CON_RI also becomes zero, and thus the steering reaction force component caused by the road information transmission control also becomes zero. That is, the road information transmission control is deactivated (turned OFF).

Figure 10:
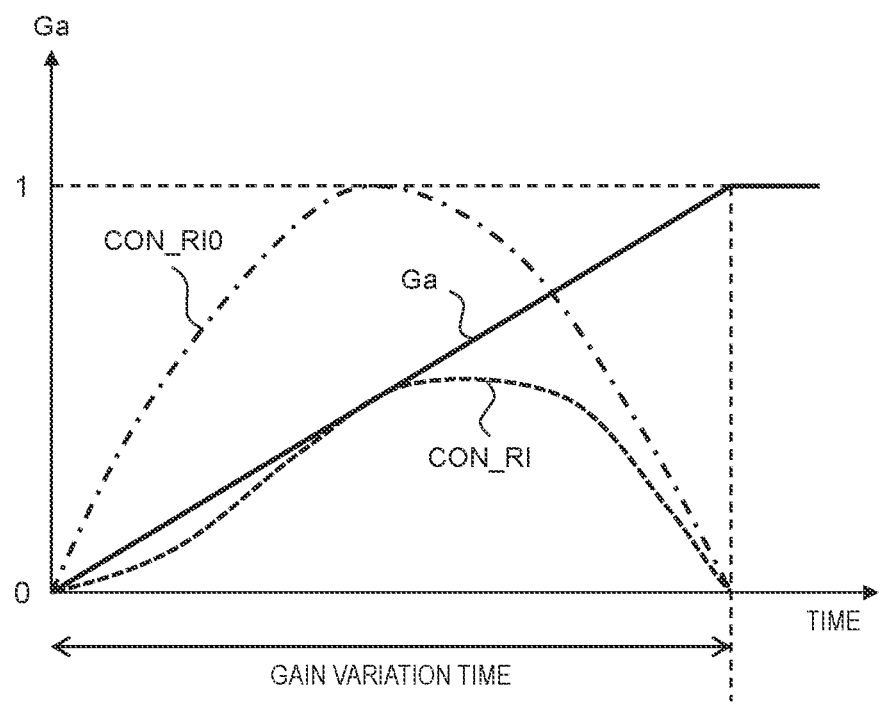
FIG. 10 is a diagram for explaining a change in control amount gain in an embodiment.

When switching the control amount gain Ga, the guard unit 323 gradually changes the control amount gain Ga in order to suppress a rapid change in the steering reaction force. FIG. 10 is a diagram for explaining the change in the control amount gain Ga. In the example shown in FIG. 10, the control amount gain Ga gradually changes from "0" to "1." Respective time variations of the target control amounts CON_RI0 and CON_RI also are shown in FIG. 10. For example, a variation time of the control amount gain Ga is set to half the "inverse number of a main frequency component of the target control amount CON_RI0." Thus, a variation gradient of the target control amount CON_RI becomes less than a variation gradient of the original target control amount CON_RI0. As a result, a rapid change in the steering reaction force is suppressed.

3-4. Modification Example

Another example of the deactivation condition for deactivating the road information transmission control will be described below. Here, a case where the driving assist control is the "lane departure suppression control (LDA)" is considered in particular. As described above, the lane departure suppression control vibrates the steering wheel 3 for notifying the driver of a possibility of the lane departure. If the road information transmission control operates when such the lane departure suppression control is in operation, interference or resonance between the steering wheel vibrations due to both the control may be caused. When the interference or resonance between the steering wheel vibrations occurs, the steering wheel vibration amount becomes insufficient or excessive, and thus the warning effect obtained by the lane departure suppression control is reduced.

In view of the above, according to the modification example, when the lane departure suppression control is in operation, the reaction force control unit 300 sets the steering reaction force component caused by the road information transmission control to zero. That is, the deactivation condition according to the modification example is that "the lane departure suppression control is in operation." This makes it possible to suppress the interference or resonance between the steering wheel vibrations when the lane departure suppression control is in operation and thus to suppress reduction in warning effect obtained by the lane departure suppression control.

Figure 11:
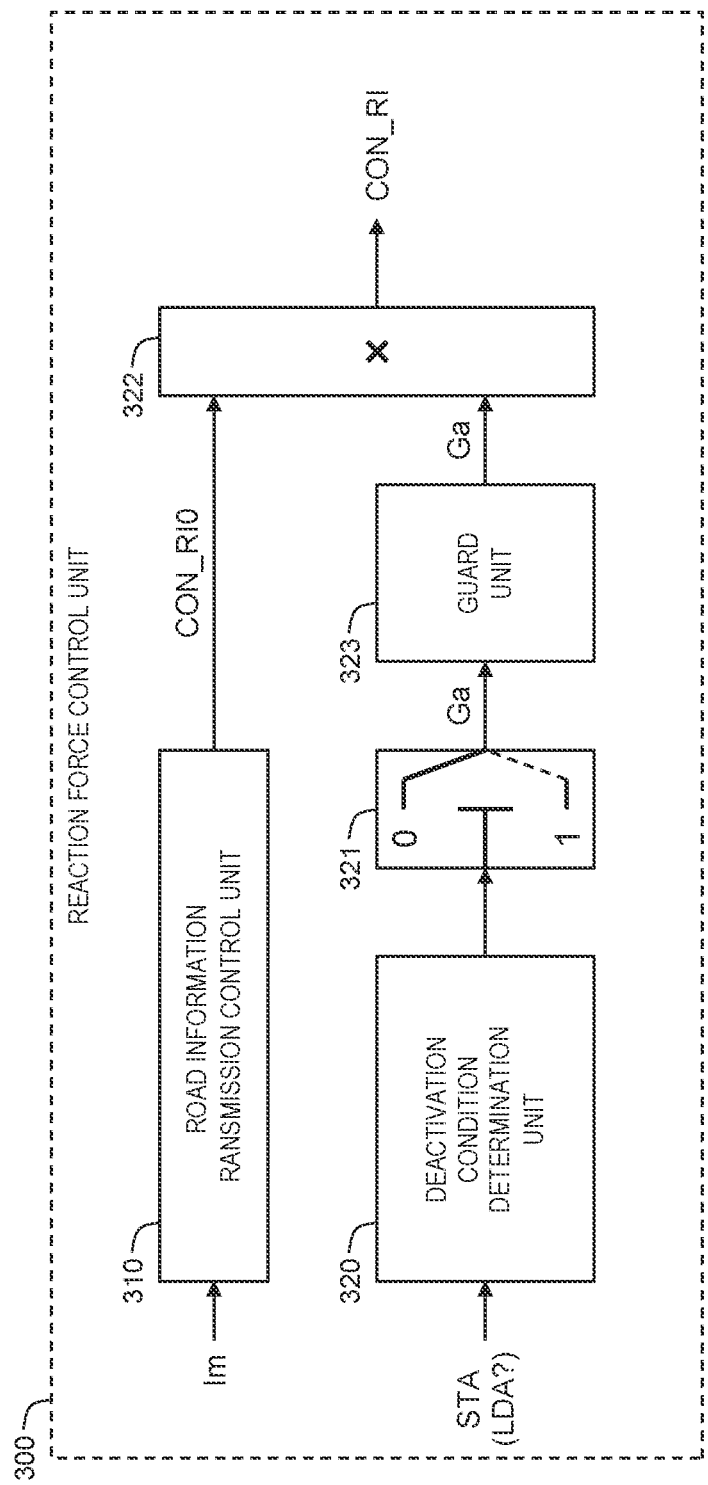
FIG. 11 is a block diagram showing a functional configuration example related to road information transmission control according to a modification example.

FIG. 11 is a block diagram showing a functional configuration example related to the road information transmission control according to the modification example. The deactivation condition determination unit 320 determines whether or not the deactivation condition is satisfied based on the driving assist control state information STA. The driving assist control state information STA indicates the type of the driving assist control being in operation, in addition to whether or not the driving assist control is in operation. Others are the same as in the case of the functional configuration example shown in FIG. 9.

3-5. Effects

According to the present embodiment, as described above, when the deactivation condition is satisfied, the steering reaction force component caused by the road information transmission control is set to zero.

A first example of the deactivation condition is that the driving assist control is in operation and the steering parameter reflecting the steering intention of the driver is less than the threshold Tth_RI. This deactivation condition makes it possible to suppress the driver from feeling annoyed when there is no or weak steering intention of the driver.

A second example of the deactivation condition is that the lane departure suppression control that vibrates the steering wheel 3 for notifying the driver of a possibility of the lane departure is in operation. This deactivation condition makes it possible to suppress the interference or resonance between the steering wheel vibrations and thus to suppress reduction in warning effect obtained by the lane departure suppression control.

4. Deviation Compensation Control

4-1. Basic Explanation

As described above, the turning control unit 200 executes the turning control in response to a steering operation of the steering wheel 3 performed by the driver. For example, the turning control unit 200 calculates the target turn angle δt based on the steering angle θs and the vehicle speed V. Then, the turning control unit 200 controls the turning actuator 21 such that the actual turn angle δa of the wheel 2 follows the target turn angle δt. Here, a deviation (gap) may occur between the steering operation by the driver and the turning of the wheel 2. For example, when the driver rotates the steering wheel 3 at a considerable speed, a deviation (gap) between the target turn angle δt and the actual turn angle δa may occur due to a response delay of the turning actuator 21.

Deviation compensation control is the reaction force control intended to reduce the deviation between the steering operation by the driver and the turning of the wheel 2. For the sake of convenience, the target turn angle δt according to the steering operation by the driver is hereinafter referred to as a "first target turn angle δt1." The deviation compensation control detects a deviation between the first target turn angle δt1 and the actual turn angle δa and applies a steering reaction force component to the steering wheel 3 in a direction of reducing the deviation. That is to say, the deviation compensation control applies a steering reaction force component to the steering wheel 3 in a direction that hinders the driver's steering operation. As a result, it becomes harder for the driver to rotate the steering wheel 3, and thus the deviation is expected to be reduced.

Figure 12:
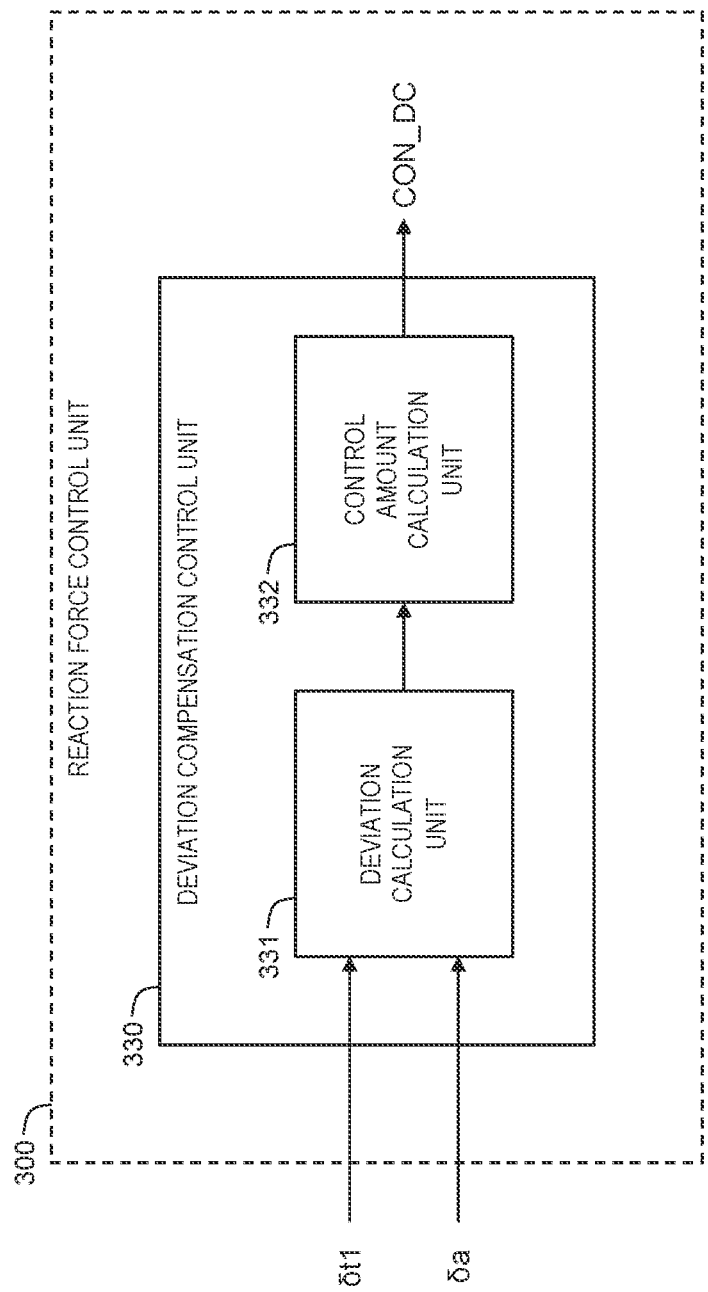
FIG. 12 is a block diagram for explaining deviation compensation control according to an embodiment.

FIG. 12 is a block diagram for explaining the deviation compensation control according to the present embodiment. The reaction force control unit 300 includes a deviation compensation control unit 330. The deviation compensation control unit 330 includes a deviation calculation unit 331 and a control amount calculation unit 332.

The deviation calculation unit 331 calculates the deviation between the first target turn angle δt1 and the actual turn angle δa. The first target turn angle δt1 is calculated by the turning control unit 200. The actual turn angle δa is obtained from the rotational angle sensor 54.

The control amount calculation unit 332 calculates a target control amount CON_DC for generating a steering reaction force component in a direction of reducing the deviation. For example, the control amount calculation unit 332 calculates the target control amount CON_DC such that the steering reaction force increases as the deviation becomes larger.

The reaction force control unit 300 calculates a final target control amount by combining the target control amount CON_DC caused by the deviation compensation control and another target control amount caused by another type of reaction force control. Then, the reaction force control unit 300 executes the reaction force control by controlling the reaction force actuator 31 of the reaction force device 30 in accordance with the final target control amount.

4-2. Turn Angle Distribution Control

Next, a case where the driver starts steering during operation of the driving assist control is considered. In this case, mediation between the steering operation by the driver and the steering control by the driving assist control may be performed. For the sake of convenience, the target turn angle δt required by the driving assist control is hereinafter referred to as a "second target turn angle δt2." When a predetermined condition is satisfied, a final target turn angle δt is determined by combining the first target turn angle δt1 and the second target turn angle δW2. Such the process of combining the first target turn angle δt1 and the second target turn angle δt2 to determine the target turn angle δt is hereinafter referred to as "turn angle distribution control." The predetermined condition for performing the turn angle distribution control is hereinafter referred to as a "turn angle distribution condition."

Figure 13:
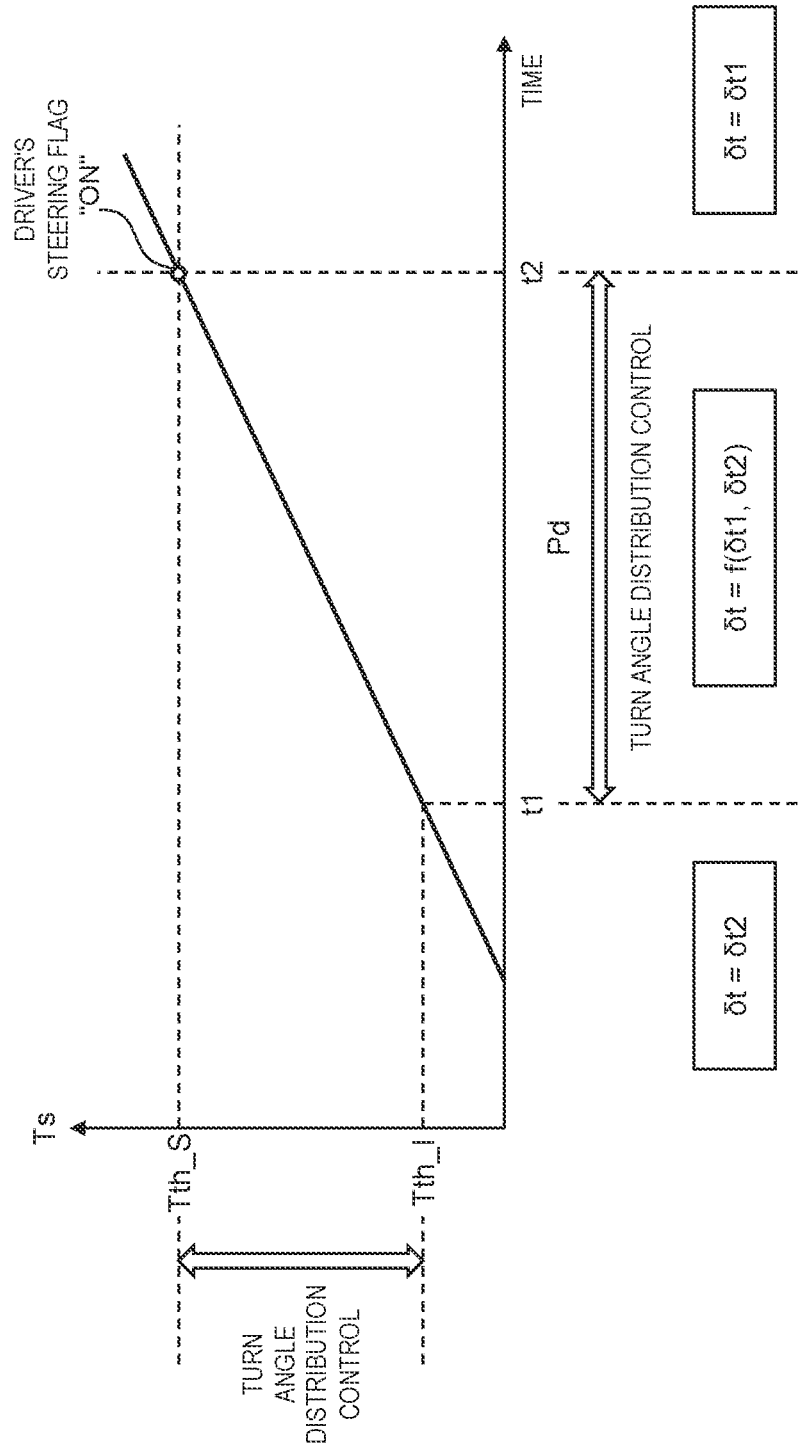
FIG. 13 is a diagram for explaining an example of turn angle distribution control according to an embodiment.

FIG. 13 is a diagram for explaining an example of the turn angle distribution control. A horizontal axis represents time, and a vertical axis represents the steering parameter. The steering parameter, which is a parameter reflecting the steering intention of the driver, is for example the steering torque Ts.

As described above, the steering determination threshold Tth_S is a threshold used for the driver's steering determination. When the steering parameter is equal to or greater than the steering determination threshold Tth_S, the control device 100 determines that the driver is steering the steering wheel 3 and sets the driver's steering flag to ON. In this case, it is preferable that the turning control unit 200 performs the turning control in accordance with the first target turn angle δt1 required by the driver, and therefore the first target turn angle δt1 is used as the target turn angle δt (i.e., δt=δt1).

An intervention threshold Tth_I is less than the steering determination threshold Tth_S. When the steering parameter is equal to or less than the intervention threshold Tth_I, the turning control unit 200 performs the turning control in accordance with the second target turn angle δt2 required by the driving assist control. That is, the target turn angle δt is the second target turn angle δt2 (i.e., δt=δt2).

The turn angle distribution condition is that the steering parameter is in a range from the intervention threshold Tth_I (first threshold) to the steering determination threshold Tth_S (second threshold). When this turn angle distribution condition is satisfied, the turning control unit 200 determines the final target turn angle δt by combining the first target turn angle δt1 and the second target turn angle δt2. That is, the target turn angle δt is given as a function of the first target turn angle δt1 and the second target turn angle δt2 (i.e., δt=f(δt1, δt2)).

In the example shown in FIG. 13, the steering parameter gradually increases with time. At a time t1, the steering parameter reaches the intervention threshold Tth_I. As a result, the turn angle distribution control is started. At a time t2 after the time t1, the steering parameter reaches the steering determination threshold Tth_S. As a result, the turn angle distribution control ends. A period Pd from the time t1 and the time t2 is the period in which the turn angle distribution condition is satisfied and the turn angle distribution control is performed.

Figure 14:
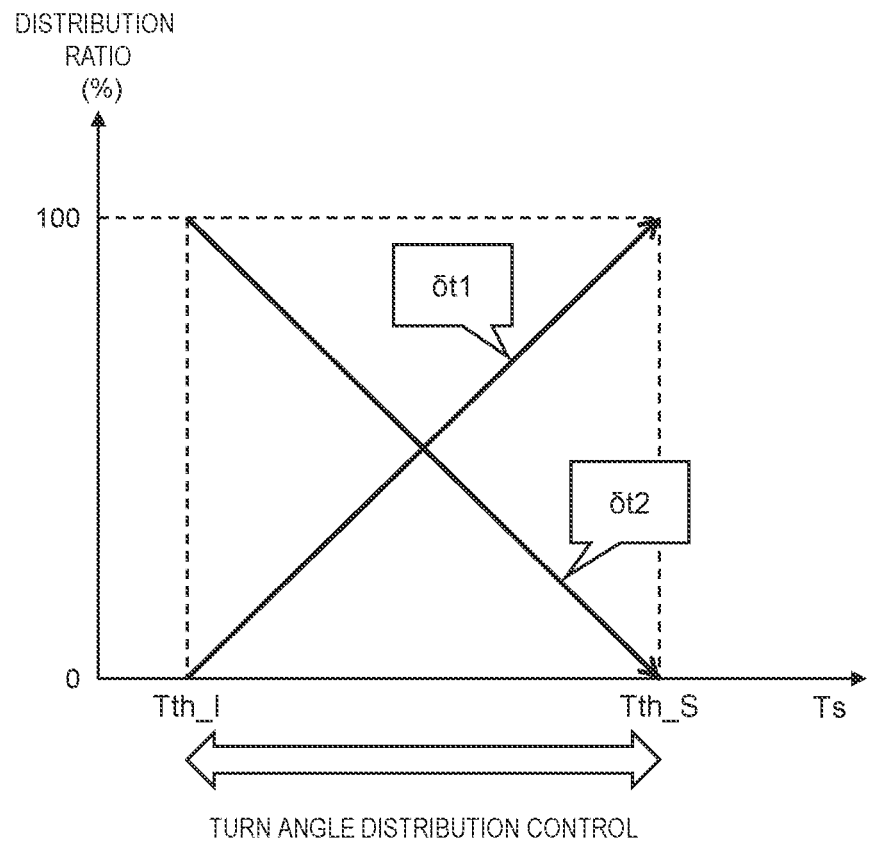
FIG. 14 is a diagram for explaining an example of turn angle distribution control according to an embodiment.

FIG. 14 shows an example of distribution ratios of the first target turn angle δt1 and the second target turn angle δt2 in the turn angle distribution control. A horizontal axis represents the steering parameter, and a vertical axis represents the distribution ratio. It can be said that the distribution ratio is a rate of contribution to the final target turn angle δt. As the steering parameter increases from the intervention threshold Tth_I to the steering determination threshold Tth_S, the distribution ratio of the first target turn angle δt1 increases while the distribution ratio of the second target turn angle δt2 decreases. For example, when the steering parameter is equal to the intervention threshold Tth_I, the distribution ratio of the first target turn angle δt1 is 0% and the distribution ratio of the second target turn angle δt2 is 100%. When the steering parameter is equal to the steering determination threshold Tth_S, the distribution ratio of the first target turn angle δt1 is 100% and the distribution ratio of the second target turn angle δt2 is 0%.

Figure 15:
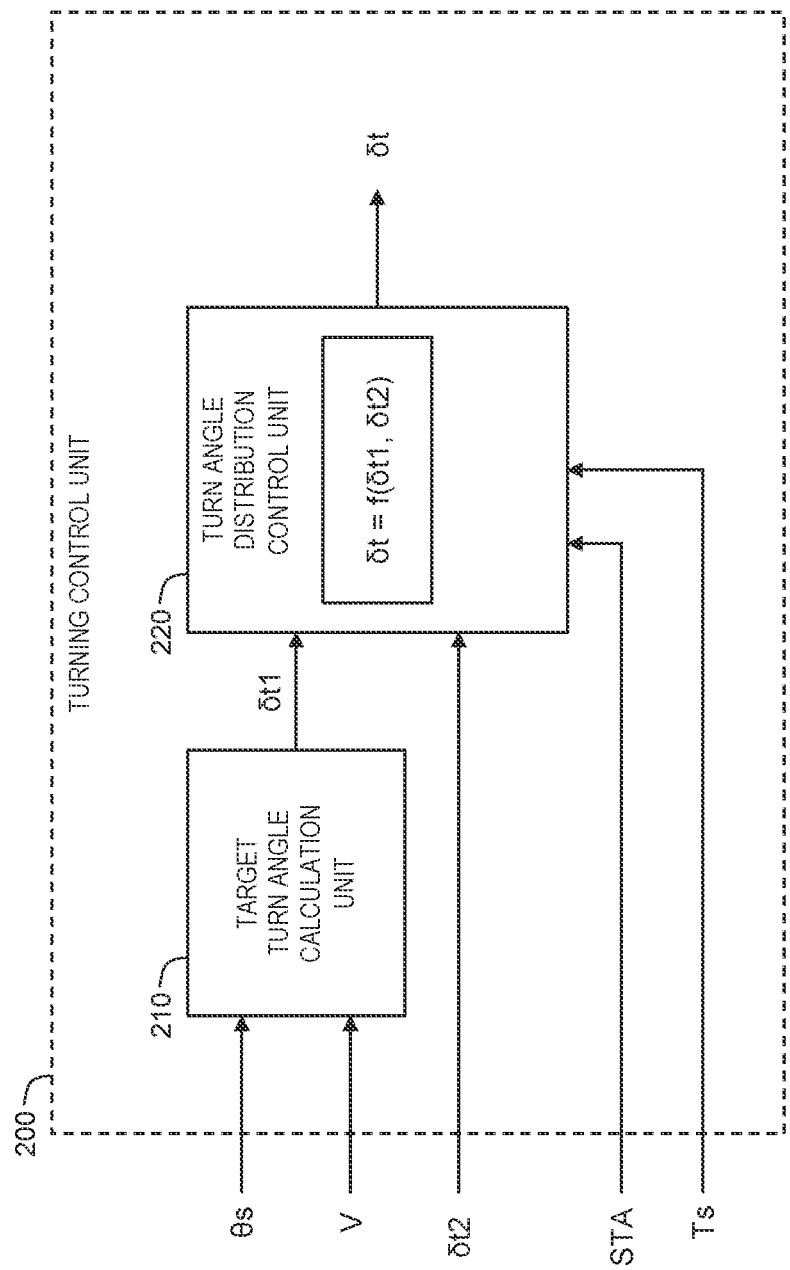
FIG. 15 is a block diagram for explaining processing related to turn angle distribution control according to an embodiment.

FIG. 15 is a block diagram for explaining processing related to the turn angle distribution control. The turning control unit 200 includes a target turn angle calculation unit 210 and a turn angle distribution control unit 220.

The target turn angle calculation unit 210 calculates the first target turn angle δt1 according to the steering operation of the steering wheel 3 by the driver. For example, the target turn angle calculation unit 210 calculates the first target turn angle δt1 based on the steering angle θs and the vehicle speed V. The steering angle θs is detected by the steering angle sensor 51. As another example, the steering angle θs may be calculated from the rotation angle Φ detected by the rotational angle sensor 53. The vehicle speed V is detected by the vehicle speed sensor 56.

The turn angle distribution control unit 220 receives the first target turn angle δt1, the second target turn angle δt2, the driving assist control state information STA, and the steering parameter. The second target turn angle δt2 is given from the driving assist control unit 400. As another example, the second target turn angle δt2 may be calculated based on the target control amount given from the driving assist control unit 400. The driving assist control state information STA, which includes information indicating whether or not the driving assist control is in operation, is given from the driving assist control unit 400.

During operation of the driving assist control, the turn angle distribution control unit 220 determines whether or not the turn angle distribution condition is satisfied based on the steering parameter. The turn angle distribution condition is that the steering parameter is in a range from the intervention threshold Tth_I (first threshold) to the steering determination threshold Tth_S (second threshold). When the turn angle distribution condition is satisfied, the turn angle distribution control unit 220 determines the target turn angle δt by combining the first target turn angle δt1 and the second target turn angle δt2. Then, the turning control unit 200 performs the turning control according to the target turn angle δt.

4-3. Deactivation of Deviation Compensation Control

Figure 16:
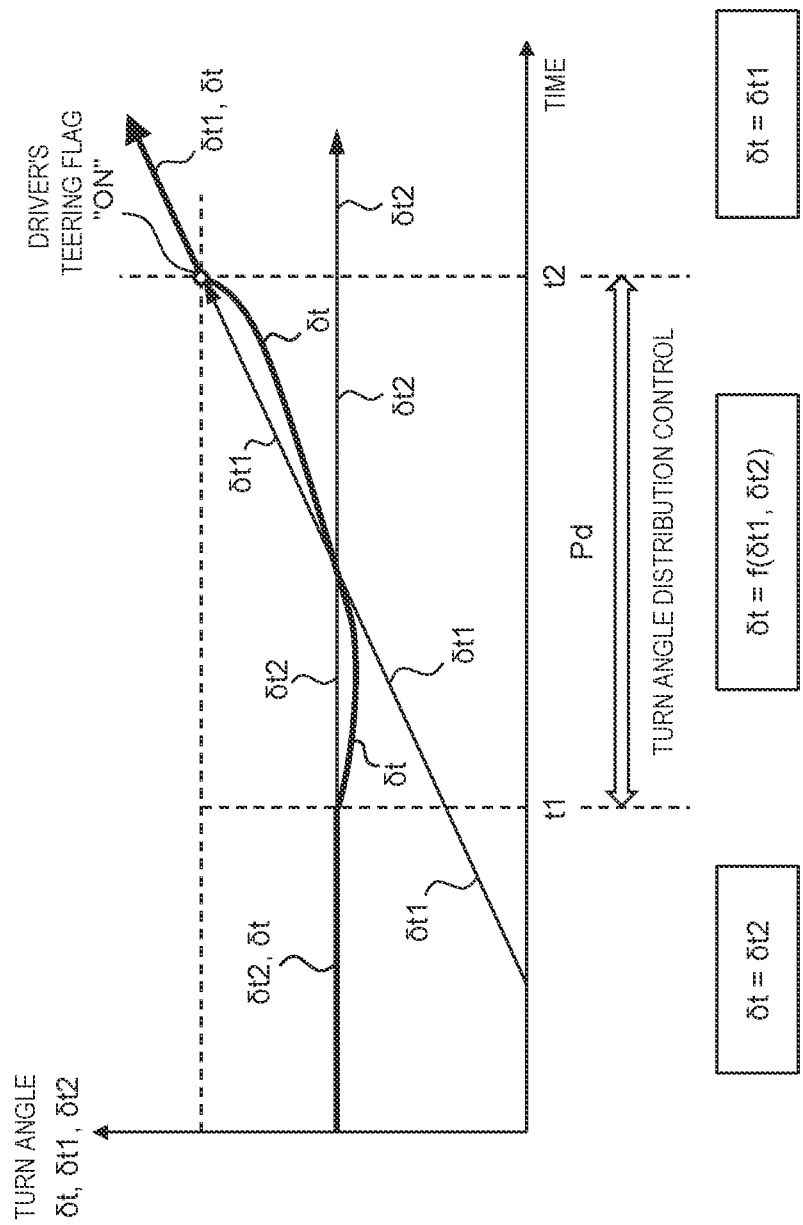
FIG. 16 is a diagram for explaining a problem in a case where turn angle distribution control and deviation compensation control are simultaneously in operation.

In a situation where the turn angle distribution control and the deviation compensation control are simultaneously in operation, the following problem is caused. FIG. 16 is a diagram for explaining the problem. A horizontal axis represents time, and a vertical axis represents the first target turn angle δt1, the second target turn angle δt2, and the target turn angle δt. The actual turn angle δa follows the target turn angle δt. Hereinafter, the actual turn angle δa and the target turn angle δt are regarded as equivalent.

During operation of the driving assist control, the driver starts steering. The first target turn angle δt1 according to the driver's steering operation increases with time. The period Pd in which the turn angle distribution control is performed is the same as in the case shown in FIG. 13 described above. After the time t2, the target turn angle δt is equal to the first target turn angle δt1 and the actual turn angle δa follows the first target turn angle δt1.

However, in the period before the time t2, the target turn angle δt is different from the first target turn angle δt1 and thus a deviation occurs between the actual turn angle δa and the first target turn angle δt1. At least in the period Pd in which the turn angle distribution control is performed, the target turn angle δt is different from the first target turn angle δt1 and thus a deviation occurs between the actual turn angle δa and the first target turn angle δt1. The deviation compensation control applies the steering reaction force component to the steering wheel 3 in a direction of reducing the deviation. That is to say, the deviation compensation control applies the steering reaction force component to the steering wheel 3 in a direction that hinders the driver's steering operation. However, the deviation here is not caused by the response delay of the turning actuator 21, and the deviation compensation control does not bring about its intended function effect. Rather, the deviation compensation control unnecessarily interferes the driver's steering operation and deteriorates operability of the steering wheel 3.

In view of the above, according to the present embodiment, the reaction force control unit 300 deactivates the deviation compensation control in at least a part of the period Pd in which the turn angle distribution condition is satisfied. "Deactivating the deviation compensation control" means setting the steering reaction force component caused by the deviation compensation control to zero. This makes it possible to suppress the deviation compensation control from unnecessarily interfering the steering operation. That is, reduction in operability of the steering wheel 3 is suppressed.

For example, the reaction force control unit 300 deactivates the deviation compensation control at least when the turn angle distribution condition is satisfied. This means that the deviation compensation control is deactivated in the whole period Pd in which the turn angle distribution condition is satisfied. As a result, the reduction in operability of the steering wheel 3 is more effectively suppressed.

As described above, the turn angle distribution condition is that the steering parameter is in the range from the intervention threshold Tth_I (first threshold) to the steering determination threshold Tth_S (second threshold). The reaction force control unit 300 may set a threshold Tth_DC and compare the steering parameter with the threshold Tth_DC. The threshold Tth_DC is set to be greater than the intervention threshold Tth_I and equal to or less than the steering determination threshold Tth_S. When the steering parameter is less than the threshold Tth_DC, the reaction force control unit 300 deactivates the deviation compensation control. As a result, the deviation compensation control is deactivated in at least a part of the period Pd in which the turn angle distribution condition is satisfied. It can be said that a deactivation condition for deactivating the deviation compensation control is that "the driving assist control is in operation and the steering parameter is less than the threshold Tth_DC."

Figure 17:
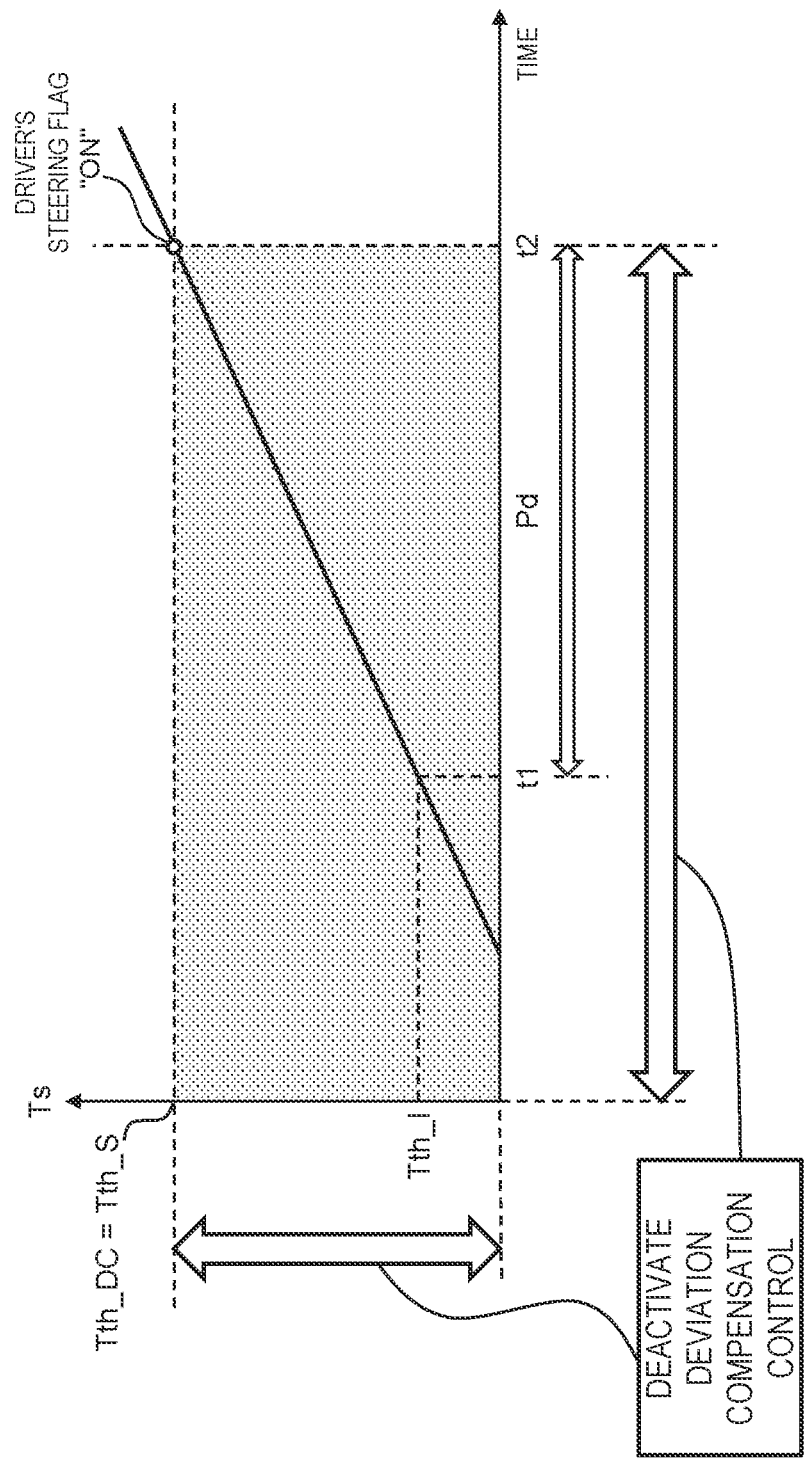
FIG. 17 is a diagram for explaining an example of deactivation of deviation compensation control according to an embodiment.

FIG. 17 is a diagram for explaining an example of the deactivation of the deviation compensation control. Its format is the same as that of FIG. 13 described above. The horizontal axis represents the time, and the vertical axis represents the steering parameter (e.g., the steering torque Ts). In the example shown in FIG. 17, the threshold Tth_DC regarding the deviation compensation control is set to be equal to the steering determination threshold Tth_S (i.e., Tth_DC=Tth_S). In this case, it can be said that the deactivation condition for deactivating the deviation compensation control is that "the driving assist control is in operation and the driver's steering flag is OFF." In the period before the time t2, the deactivation condition is satisfied and the deviation compensation control is deactivated. As a result, the reduction in operability of the steering wheel 3 is effectively suppressed.

Figure 18:
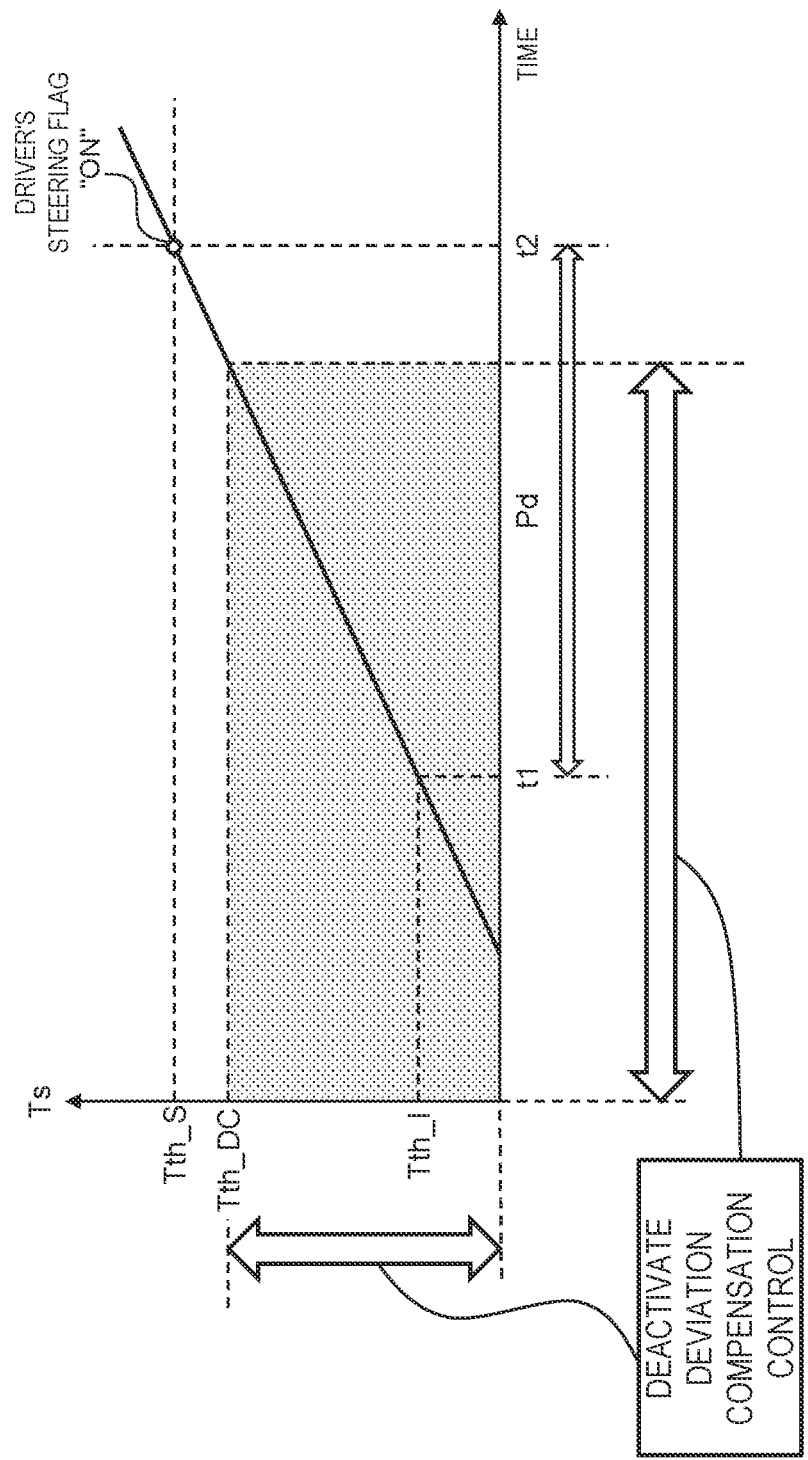
FIG. 18 is a diagram for explaining another example of deactivation of deviation compensation control according to an embodiment.

FIG. 18 is a diagram for explaining another example of the deactivation of the deviation compensation control. In the example shown in FIG. 18, the threshold Tth_DC regarding the deviation compensation control is set to be greater than the intervention threshold Tth_I and less than the steering determination threshold Tth_S (i.e., Tth_I<Tth_DC<Tth_S). As a result, the deviation compensation control is deactivated in at least a part of the period Pd in which the turn angle distribution control is performed, and thus the effect can be obtained.

Figure 19:
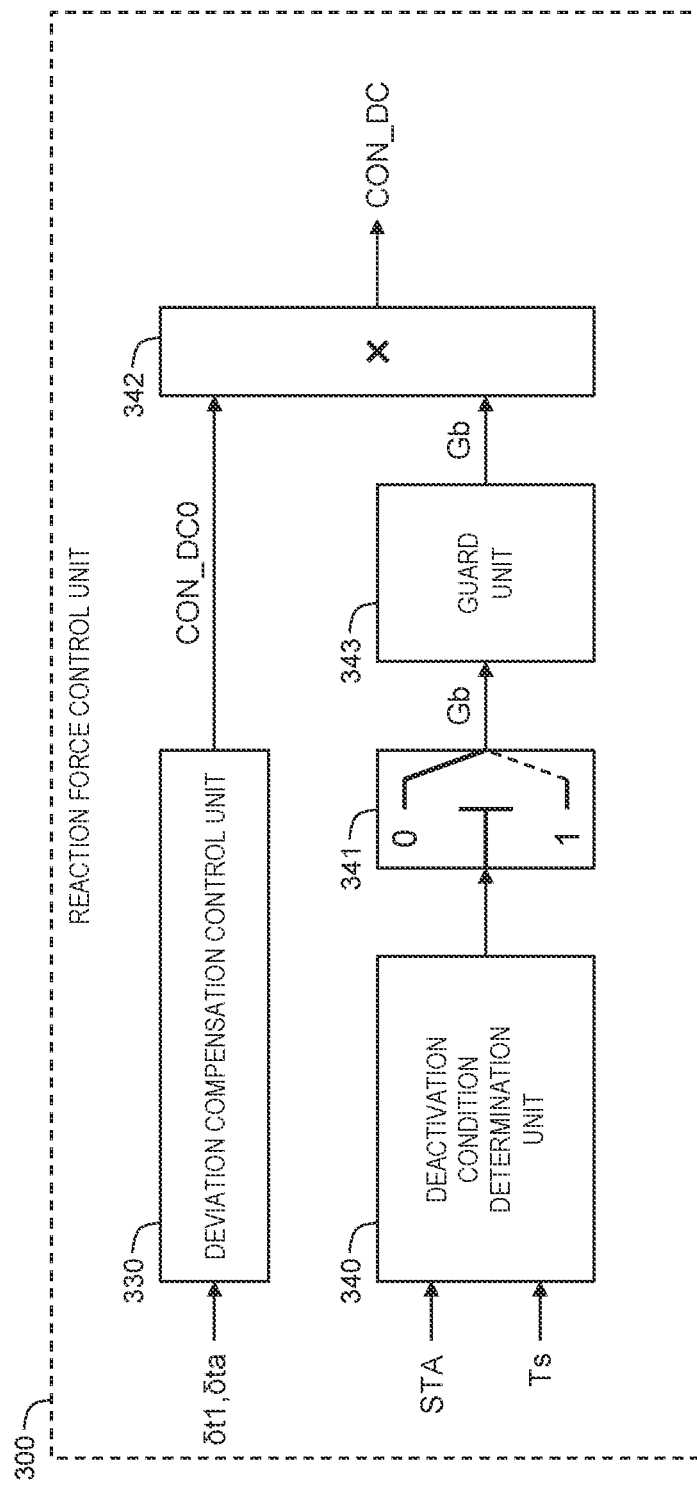
FIG. 19 is a block diagram showing a functional configuration example related to deviation compensation control according to an embodiment.

4-4. Functional Configuration Example Related to Deviation Compensation Control FIG. 19 is a block diagram showing a functional configuration example related to the deviation compensation control according to the present embodiment. The reaction force control unit 300 includes the deviation compensation control unit 330, a deactivation condition determination unit 340, a gain switching unit 341, and a multiplier unit 342. The reaction force control unit 300 may further include a guard unit 343.

As described above, the deviation compensation control unit 330 calculates the target control amount CON_DC based on the first target turn angle δt1 and the actual turn angle δa (see FIG. 12). For convenience sake, the target control amount CON_DC calculated by the deviation compensation control unit 330 is hereinafter referred to as a "target control amount CON_DC0."

The deactivation condition determination unit 340 determines whether or not the deactivation condition is satisfied based on driving assist control state information STA and the steering parameter (e.g., the steering torque Ts). The driving assist control state information STA includes information indicating whether or not the driving assist control is in operation. The driving assist control state information STA is given from the driving assist control unit 400. For example, the deactivation condition is that "the turn angle distribution condition is satisfied during operation of the driving assist control." As another example, the deactivation condition is that "the driving assist control is in operation and the steering parameter is less than the threshold Tth_DC."

The gain switching unit 341 switches a control amount gain Gb according to a result of determination by the deactivation condition determination unit 340. More specifically, when the deactivation condition is satisfied, the gain switching unit 341 sets the control amount gain Gb to "0." On the other hand, when the deactivation condition is not satisfied, the gain switching unit 341 sets the control amount gain Gb to "1."

The multiplier unit 342 multiplies the target control amount CON_DC0 calculated by the deviation compensation control unit 330 by the control amount gain Gb to calculate a final target control amount CON_DC regarding the deviation compensation control (i.e., CON_DC=Gb× CON_DC0).

When the deactivation condition is satisfied, the control amount gain Gb is set to "0." As a result, the target control amount CON_DC also becomes zero, and thus the steering reaction force component caused by the deviation compensation control also becomes zero. That is, the deviation compensation control is deactivated (turned OFF).

Figure 20:
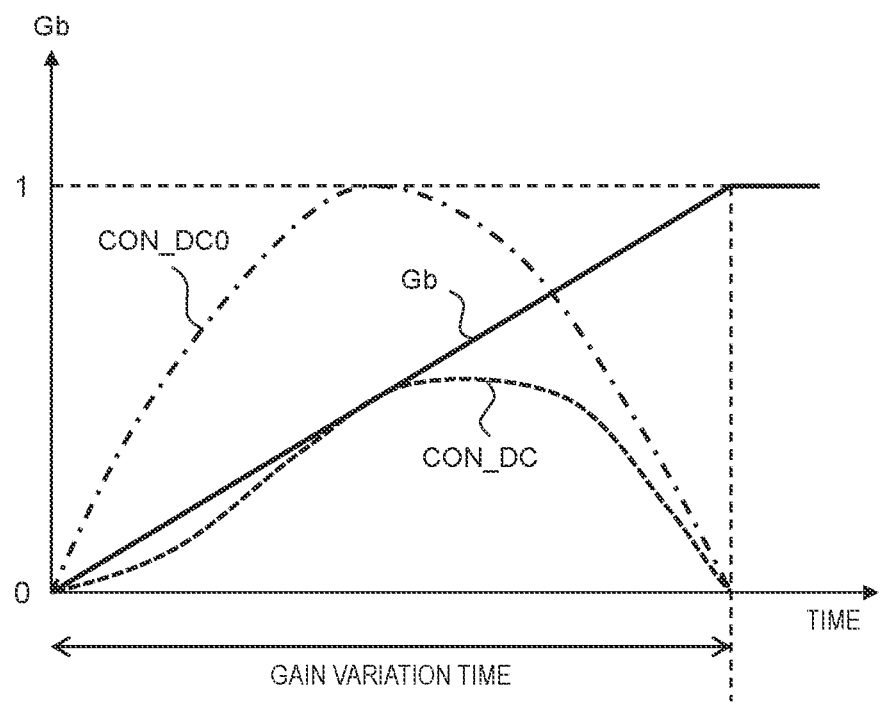
FIG. 20 is a diagram for explaining a change in control amount gain in an embodiment.

When switching the control amount gain Gb, the guard unit 343 gradually changes the control amount gain Gb in order to suppress a rapid change in the steering reaction force. FIG. 20 is a diagram for explaining the change in the control amount gain Gb. In the example shown in FIG. 20, the control amount gain Gb gradually changes from "0" to "1." Respective time variations of the target control amounts CON_DC0 and CON_DC also are shown in FIG. 20. For example, a variation time of the control amount gain Gb is set to half the "inverse number of a main frequency component of the target control amount CON_DC0." Thus, a variation gradient of the target control amount CON_DC becomes less than a variation gradient of the original target control amount CON_DC0. As a result, a rapid change in the steering reaction force is suppressed.

4-5. Effect

According to the present embodiment, as described above, the steering reaction force component caused by the deviation compensation control is set to zero in at least a part of the period Pd in which the turn angle distribution condition is satisfied. This makes it possible to suppress the deviation compensation control from unnecessarily interfering the steering operation. It is thus possible to suppress reduction in operability of the steering wheel 3.

What is claimed is:

1. A vehicle control system that controls a vehicle of a steer-by-wire type,
the vehicle control system comprising one or more processors configured to execute:
turning control that turns a wheel of the vehicle according to a target turn angle;
reaction force control that applies a steering reaction force to a steering wheel of the vehicle; and
driving assist control that assists driving of the vehicle, wherein
the turning control includes:
calculating a first target turn angle according to a steering operation of the steering wheel by a driver of the vehicle; and
turn angle distribution control that determines the target turn angle by combining the first target turn angle and a second target turn angle required by the driving assist control, when a turn angle distribution condition is satisfied during operation of the driving assist control,
the reaction force control includes deviation compensation control that detects a deviation between the first target turn angle and an actual turn angle and applies a steering reaction force component to the steering wheel in a direction of reducing the deviation, the one or more processors are further configured to set the steering reaction force component caused by the deviation compensation control to zero in at least a part of a period in which the turn angle distribution condition is satisfied, the turn angle distribution condition is that a steering parameter reflecting a steering intention of the driver is in a range from a first threshold to a second threshold greater than the first threshold, and a distribution ratio of the first target turn angle increases while a distribution ratio of the second target turn angle decreases as the steering parameter increases from the first threshold to the second threshold.

2. The vehicle control system according to claim 1, wherein the one or more processors set the steering reaction force component caused by the deviation compensation control to zero at least when the turn angle distribution condition is satisfied.

3. A vehicle control system that controls a vehicle of a steer-by-wire type, the vehicle control system comprising one or more processors configured to execute:

turning control that turns a wheel of the vehicle according to a target turn angle;

reaction force control that applies a steering reaction force to a steering wheel of the vehicle; and driving assist control that assists driving of the vehicle, wherein the turning control includes:
  calculating a first target turn angle according to a steering operation of the steering wheel by a driver of the vehicle; and
  turn angle distribution control that determines the target turn angle by combining the first target turn angle and a second target turn angle required by the driving assist control, when a turn angle distribution condition is satisfied during operation of the driving assist control, the reaction force control includes deviation compensation control that detects a deviation between the first target turn angle and an actual turn angle and applies a steering reaction force component to the steering wheel in a direction of reducing the deviation, the one or more processors are further configured to set the steering reaction force component caused by the deviation compensation control to zero in at least a part of a period in which the turn angle distribution condition is satisfied, the turn angle distribution condition is that a steering parameter reflecting a steering intention of the driver is in a range from a first threshold to a second threshold greater than the first threshold, when the steering parameter is less than a threshold, the one or more processors set the steering reaction force component caused by the deviation compensation control to zero, and the threshold is greater than the first threshold and is equal to less than the second threshold.

4. A vehicle control method that controls a vehicle of a steer-by-wire type, the vehicle control method comprising:

turning control that turns a wheel of the vehicle according to a target turn angle;

reaction force control that applies a steering reaction force to a steering wheel of the vehicle; and driving assist control that assists driving of the vehicle, wherein the turning control includes:
  calculating a first target turn angle according to a steering operation of the steering wheel by a driver of the vehicle; and
  turn angle distribution control that determines the target turn angle by combining the first target turn angle and a second target turn angle required by the driving assist control, when a turn angle distribution condition is satisfied during operation of the driving assist control, the reaction force control includes deviation compensation control that detects a deviation between the first target turn angle and an actual turn angle and applies a steering reaction force component to the steering wheel in a direction of reducing the deviation, the vehicle control method further comprises: setting the steering reaction force component caused by the deviation compensation control to zero in at least a part of a period in which the turn angle distribution condition is satisfied, the turn angle distribution condition is that a steering parameter reflecting a steering intention of the driver is in a range from a first threshold to a second threshold greater than the first threshold, and a distribution ratio of the first target turn angle increases while a distribution ratio of the second target turn angle decreases as the steering parameter increases from the first threshold to the second threshold.

* * * * *